United States Patent
Spasov et al.

(10) Patent No.: US 9,205,546 B2
(45) Date of Patent: Dec. 8, 2015

(54) DRIVING DEVICE

(75) Inventors: Robert Spasov, Schaan (LI); Karl Franz, Feldkirch (AT); Klaus Bertsch, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 1037 days.

(21) Appl. No.: 13/158,695

(22) Filed: Jun. 13, 2011

(65) Prior Publication Data
US 2011/0303723 A1 Dec. 15, 2011

(30) Foreign Application Priority Data
Jun. 15, 2010 (DE) .......................... 10 2010 030 077

(51) Int. Cl.
*B25C 1/06* (2006.01)
*B23Q 11/00* (2006.01)
*H02K 7/102* (2006.01)

(52) U.S. Cl.
CPC ............... *B25C 1/06* (2013.01); *B23Q 11/0092* (2013.01); *H02K 7/1028* (2013.01)

(58) Field of Classification Search
CPC ............... B25C 1/06; B25C 5/15; B25F 3/00; B25F 1/00; H02K 7/1028; B23Q 11/0092
USPC ..................... 227/132, 156, 129, 432, 131, 2; 173/117, 202, 1; 192/129 A, 142 R, 192/148–150; 475/157, 154
See application file for complete search history.

(56) References Cited

U.S. PATENT DOCUMENTS

| | | | | |
|---|---|---|---|---|
| 2,351,997 A | * | 6/1944 | Morrill | 477/23 |
| 2,520,204 A | * | 8/1950 | Hancock | 188/171 |
| 2,797,786 A | * | 7/1957 | Engle et al. | 192/142 R |
| 3,613,853 A | * | 10/1971 | Linthicum et al. | 192/150 |
| 3,683,217 A | * | 8/1972 | Agalakov et al. | 310/77 |
| 3,753,481 A | * | 8/1973 | Piola et al. | 192/142 R |
| 3,810,572 A | | 5/1974 | Malkin | |
| 3,913,685 A | | 10/1975 | Enstrom | |
| 3,924,692 A | | 12/1975 | Saari | |
| 4,121,745 A | | 10/1978 | Smith et al. | |
| 4,129,240 A | | 12/1978 | Geist | |

(Continued)

FOREIGN PATENT DOCUMENTS

DE 32 37 087 A1 4/1984
DE 10 2005 000 107 A1 3/2007

(Continued)

OTHER PUBLICATIONS

Office Action, German Application No. 10 2010 030 077.2, dated Nov. 17 2011.

*Primary Examiner* — Andrew M Tecco
(74) *Attorney, Agent, or Firm* — Leydig, Voit & Mayer

(57) ABSTRACT

According to one aspect of the application, a device for driving a fastening element into a substrate has an energy-transfer element for transferring energy to the fastening element. The energy-transfer element can move preferably between a starting position and a setting position, wherein the energy-transfer element is located, before a driving-in procedure, in the starting position and, after the driving-in procedure, in the setting position.

According to another aspect of the application, the device comprises a mechanical-energy storage device for storing mechanical energy. The energy-transfer element is then suitable preferably for transferring energy from the mechanical-energy storage device to the fastening element.

20 Claims, 30 Drawing Sheets

(56) References Cited

U.S. PATENT DOCUMENTS

| | | | |
|---|---|---|---|
| 4,640,452 A * | 2/1987 | Matt et al. | 227/131 |
| 4,690,252 A * | 9/1987 | Kottke et al. | 188/69 |
| 4,870,875 A * | 10/1989 | Morishita | 475/153 |
| 5,429,212 A * | 7/1995 | Schlosser | 188/69 |
| 5,700,495 A | 12/1997 | Kemerer et al. | |
| 5,794,325 A * | 8/1998 | Fallandy | 29/566.4 |
| 5,962,804 A | 10/1999 | Lee | |
| 6,515,385 B2 * | 2/2003 | Kuivamaki | 310/77 |
| 6,755,336 B2 * | 6/2004 | Harper et al. | 227/129 |
| 7,513,407 B1 | 4/2009 | Chang | |
| 7,520,414 B2 | 4/2009 | Blessing et al. | |
| 7,578,420 B2 | 8/2009 | Tanimoto et al. | |
| 7,815,088 B2 * | 10/2010 | Fielitz et al. | 227/132 |
| 7,992,756 B2 | 8/2011 | Franz et al. | |
| 2004/0149801 A1 | 8/2004 | Hirtl et al. | |
| 2004/0155743 A1 | 8/2004 | Sako | |
| 2004/0182334 A1 | 9/2004 | Grazioli et al. | |
| 2005/0051592 A1 | 3/2005 | Matthiesen et al. | |
| 2007/0023472 A1 | 2/2007 | Schiestl | |
| 2007/0045377 A1 | 3/2007 | Towfighi | |
| 2007/0095876 A1* | 5/2007 | Oda et al. | 227/131 |
| 2008/0017689 A1 | 1/2008 | Simonelli et al. | |
| 2008/0210736 A1* | 9/2008 | Blessing et al. | 227/132 |
| 2008/0257934 A1 | 10/2008 | Tanimoto et al. | |
| 2008/0296339 A1 | 12/2008 | Fielitz et al. | |
| 2009/0090759 A1 | 4/2009 | Leimbach et al. | |
| 2009/0236387 A1* | 9/2009 | Simonelli et al. | 227/8 |
| 2009/0250500 A1 | 10/2009 | Brendel et al. | |
| 2009/0321495 A1 | 12/2009 | Hirabayashi et al. | |
| 2010/0089963 A1* | 4/2010 | Franz et al. | 227/8 |
| 2010/0147919 A1 | 6/2010 | Schiestl | |
| 2011/0011608 A1 | 1/2011 | Saur | |
| 2011/0303726 A1 | 12/2011 | Blessing et al. | |
| 2011/0303727 A1 | 12/2011 | Franz et al. | |
| 2011/0303731 A1 | 12/2011 | Schiestl | |
| 2011/0303732 A1 | 12/2011 | Blessing et al. | |
| 2013/0087594 A1 | 4/2013 | Fielitz et al. | |

FOREIGN PATENT DOCUMENTS

| | | |
|---|---|---|
| DE | 10 2005 047353 A1 | 4/2007 |
| DE | 20 2007 017 485 U1 | 4/2008 |
| DE | 10 2006 000 517 A1 | 6/2008 |
| DE | 10 2007 000 226 A1 | 10/2008 |
| DE | 10 2008 042 699 A1 | 4/2010 |
| DE | 10 2008 054 816 A1 | 7/2010 |
| EP | 0 169 003 | 1/1986 |
| EP | 0 313 187 A1 | 4/1989 |
| EP | 0 403 796 A1 | 12/1990 |
| EP | 1 980 369 A2 | 10/2008 |
| JP | 2010-082788 A | 4/2010 |
| WO | WO 2007/142997 A2 | 12/2007 |
| WO | WO2009121863 A1 * | 10/2009 ............ B23Q 11/00 |

* cited by examiner

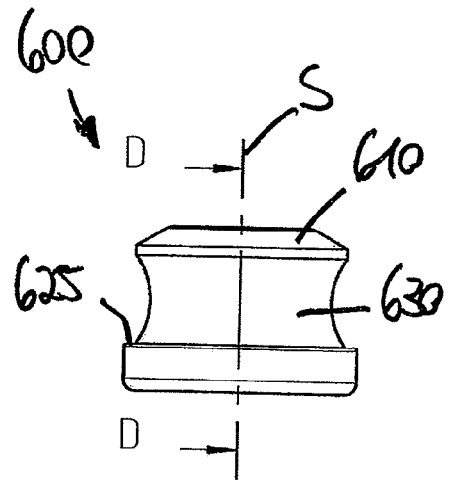
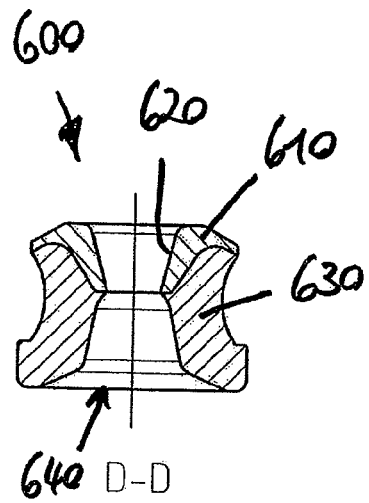
Fig. 22          Fig. 23
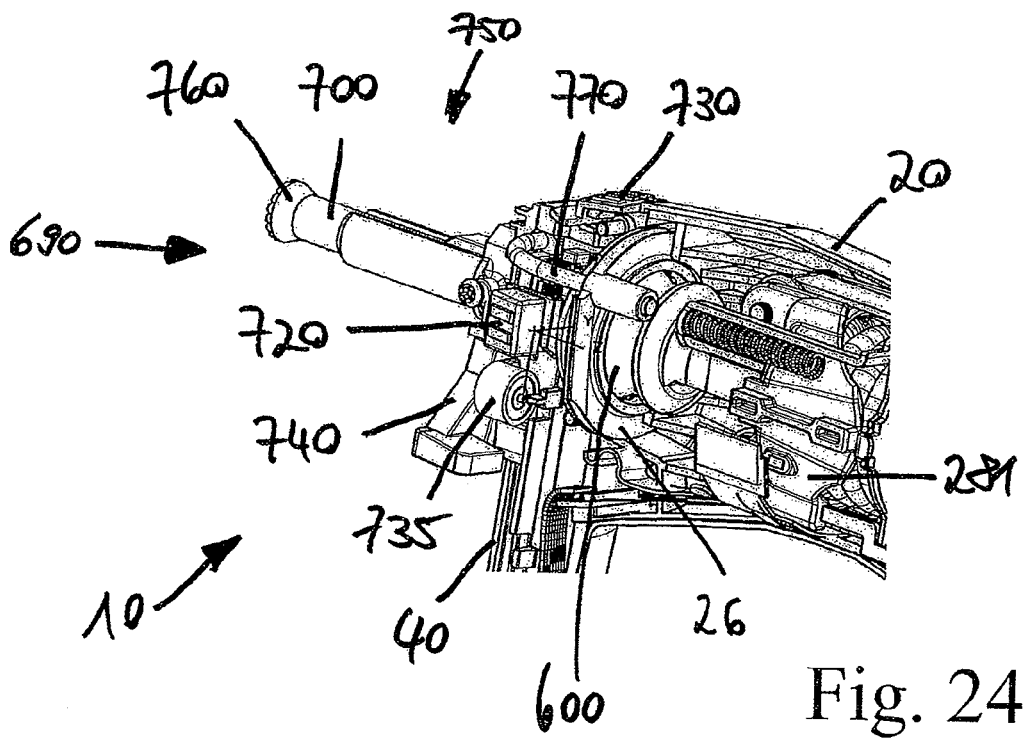
Fig. 24

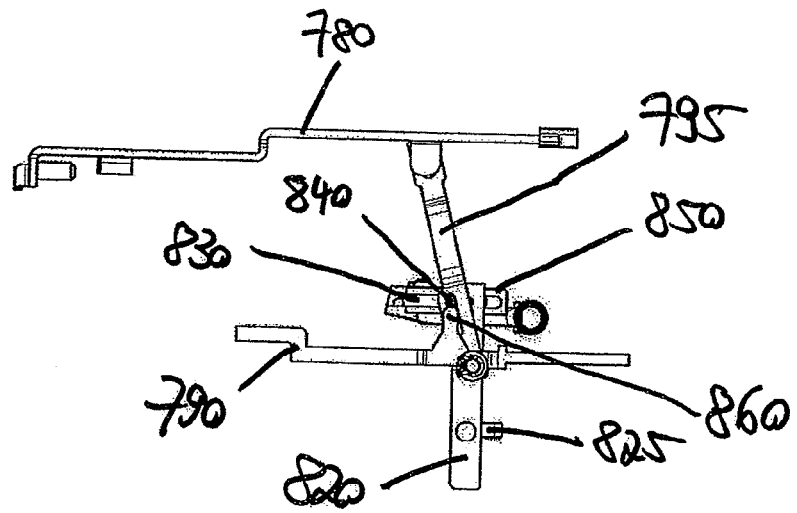
Fig. 26
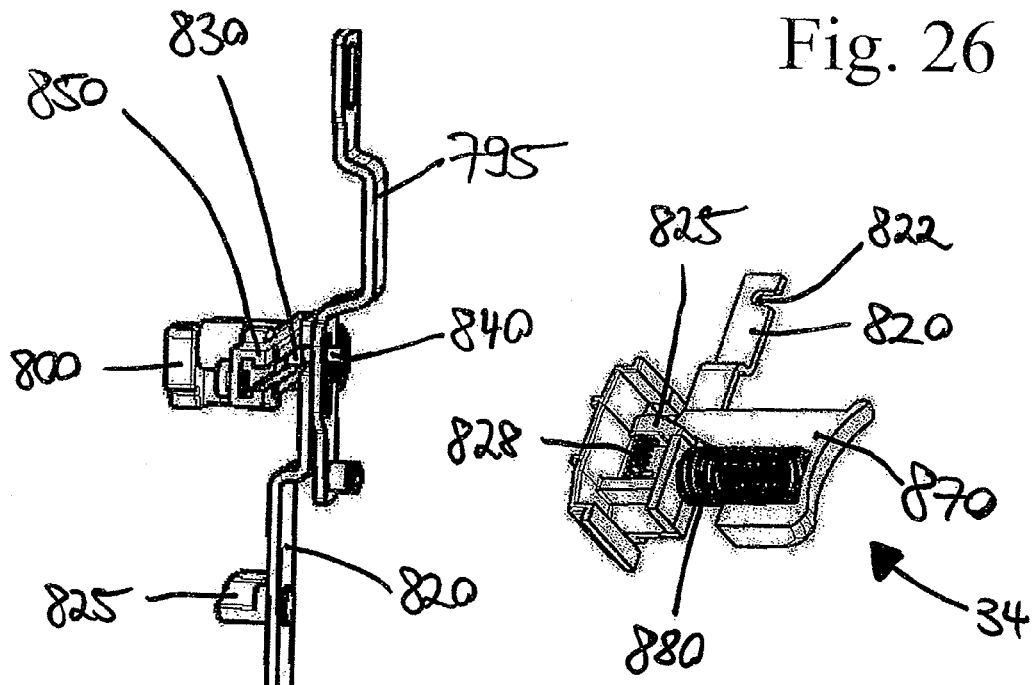
Fig. 27
Fig. 28

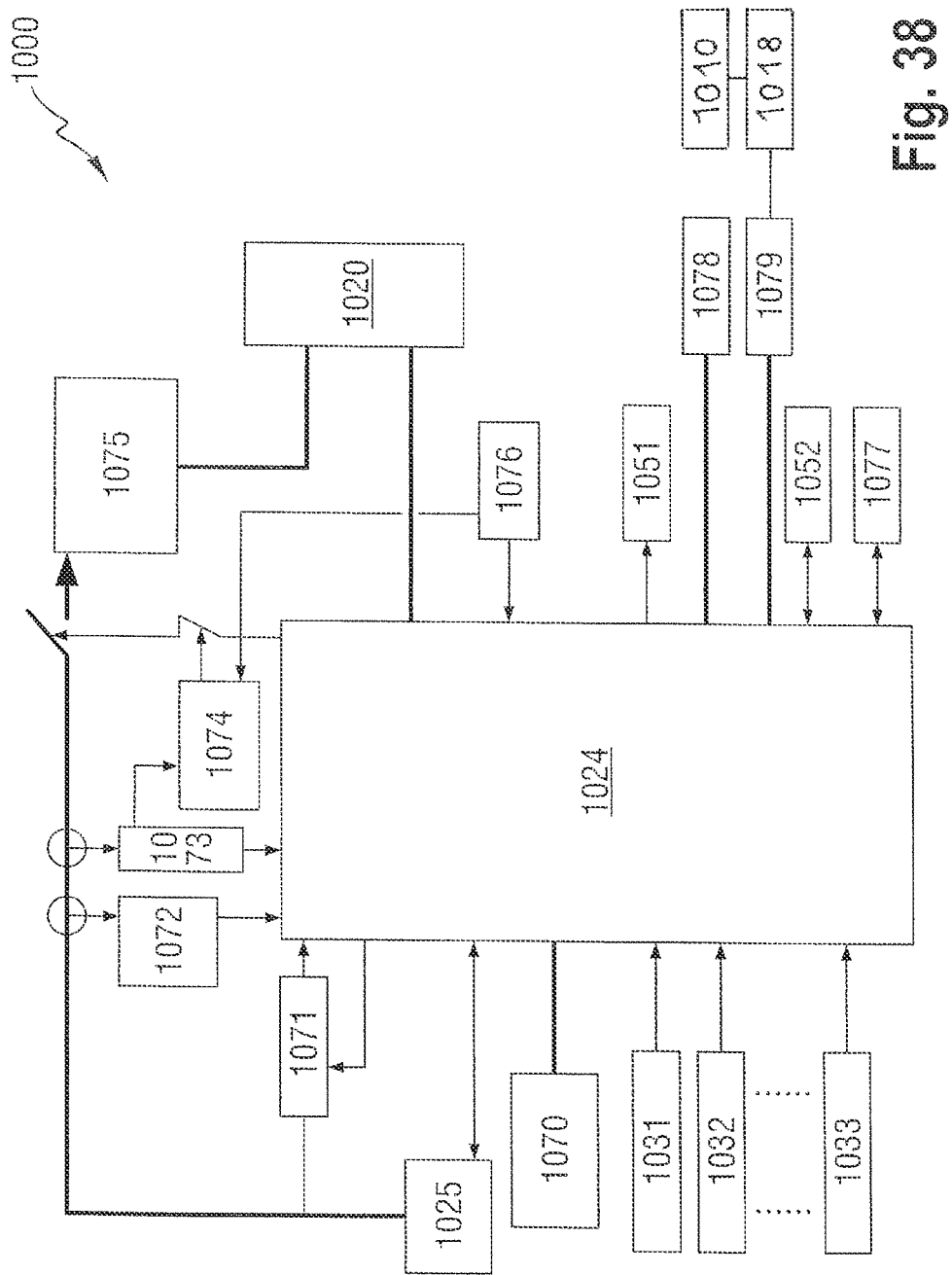

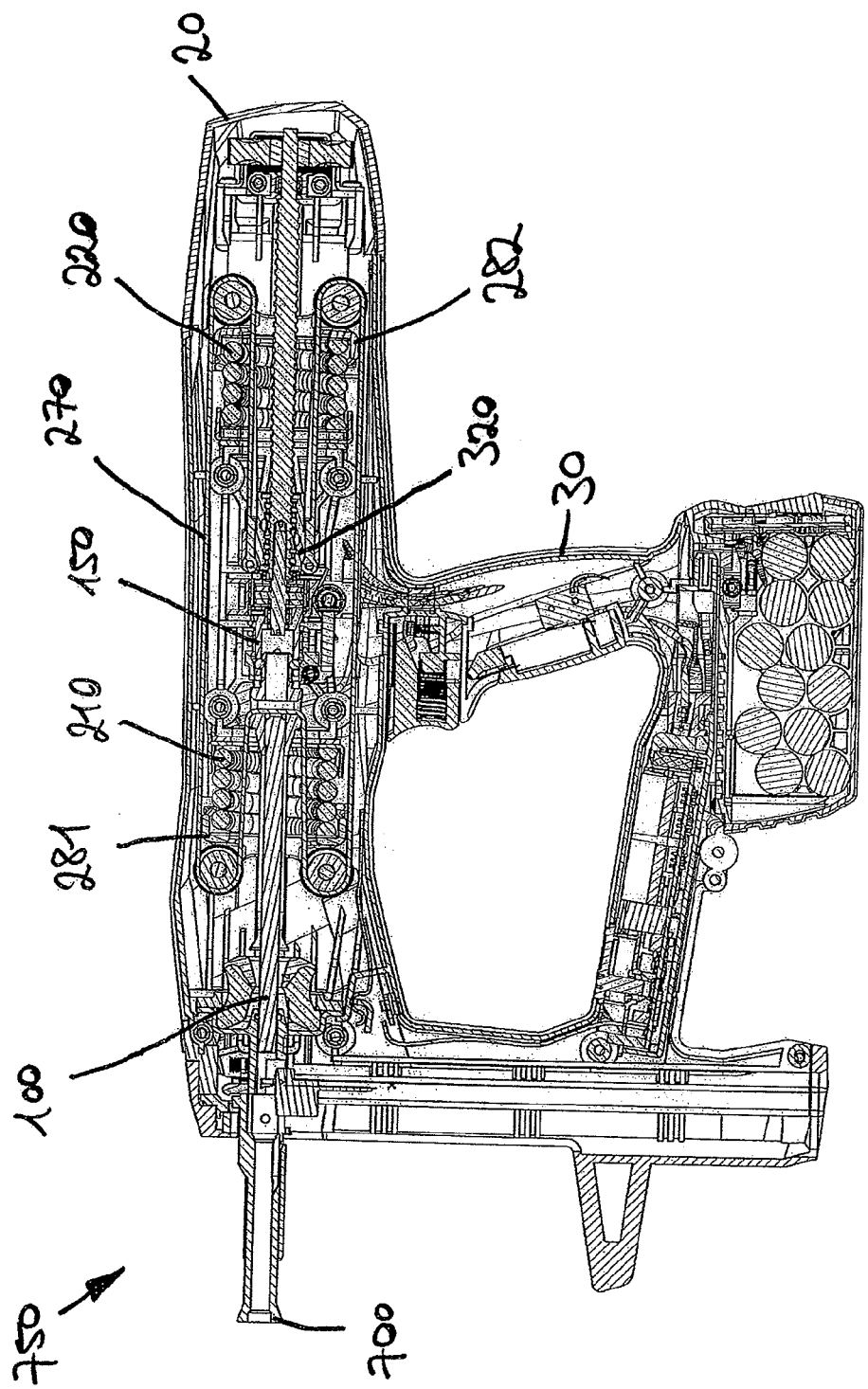

DRIVING DEVICE

FIELD OF THE TECHNOLOGY

The application relates to a device for driving a fastening element into a substrate.

BACKGROUND OF THE INVENTION

Such devices typically have a piston for transferring energy to the fastening element. The energy required for this purpose must be made available within a very short time, which is why, for example, in the case of so-called spring nailers, a spring is initially set in tension and outputs the tension energy onto the piston like an impulse during the driving-in procedure for this piston to accelerate onto the fastening element.

In such devices, the energy with which the fastening element is driven into the substrate has an upper limit, so that the devices cannot be used universally for all fastening elements and every substrate. Therefore, it is desirable to make available driving devices that can transfer sufficient energy to a fastening element.

BRIEF SUMMARY OF THE INVENTION

According to one aspect of the application, a device for driving a fastening element into a substrate has an energy-transfer element for transferring energy to the fastening element. The energy-transfer element can move preferably between a starting position and a setting position, wherein, before the driving-in procedure, the energy-transfer element is located in the starting position and, after the driving-in procedure, in the setting position.

According to one aspect of the application, the device comprises a mechanical-energy storage device for storing mechanical energy. The energy-transfer element is then suitable preferably for transferring energy from the mechanical-energy storage device to the fastening element.

According to one aspect of the application, the device comprises an energy-transfer mechanism for transferring energy from an energy source to the mechanical-energy storage device. The energy for the driving-in procedure is preferably buffered in the mechanical-energy storage device, in order to be output like an impulse onto the fastening element. The energy-transfer mechanism is preferably suitable for transporting the energy-transfer element from the setting position into the starting position. The energy source is preferably an, in particular, electrical-energy storage device, especially preferred a battery or an accumulator. The device preferably has an energy source.

According to one aspect of the application, the energy-transfer mechanism is suitable for the purpose of transporting the energy-transfer element from the setting position in the direction toward the starting position without transferring energy to the mechanical-energy storage device. In this way it is made possible that the mechanical-energy storage device can hold and/or output energy, without moving the energy-transfer element into the setting position. The energy storage device thus can be discharged without a fastening element being driven from the device.

According to one aspect of the application, the energy-transfer mechanism is suitable for transferring energy to the mechanical-energy storage device without moving the energy-transfer element.

According to one aspect of the application, the energy-transfer mechanism comprises a force-transfer mechanism for transferring a force from the energy storage device to the energy-transfer element and/or for transferring a force from the energy-transfer mechanism to the mechanical-energy storage device.

According to one aspect of the application, the energy-transfer mechanism comprises a catch element that can be brought into engagement with the energy-transfer element for moving the energy-transfer element from the setting position into the starting position.

Preferably, the catch element allows a movement of the energy-transfer element from the starting position into the setting position. In particular, the catch element contacts only the energy-transfer element, so that the catch element carries along the energy-transfer element only in one of two opposing movement directions.

Preferably, the catch element has a longitudinal body, in particular, a rod.

According to one aspect of the application, the energy-transfer mechanism comprises a linear output that can move in a linear manner and comprises the catch element and is connected to the force-transfer mechanism.

According to one aspect of the application, the device comprises a motor with a motor output, wherein the energy-transfer mechanism comprises a movement converter for converting a rotational movement into a linear movement with a rotational drive that can be driven by the motor and the linear output and a torque-transfer mechanism for transferring a torque from the motor output to the rotational drive.

Preferably, the movement converter comprises a spindle drive with a spindle and a spindle nut arranged on the spindle. According to one especially preferred embodiment, the spindle forms the rotational drive, and the spindle nut forms the linear output. According to another especially preferred embodiment, the spindle nut forms the rotational drive, and the spindle forms the linear output.

According to one aspect of the application, the linear output is arranged locked in rotation relative to the rotational drive by means of the catch element, in that, in particular, the catch element is guided into a catch element guide.

According to one aspect of the application, the energy-transfer mechanism comprises a torque-transfer mechanism for transferring a torque from the motor output to the rotational drive and a force-transfer mechanism for transferring a force from the linear output to the energy storage device.

Preferably, the mechanical-energy storage device is provided for the purpose of storing potential energy. The mechanical-energy storage device comprises, in an especially preferred way, a spring, in particular, a coil spring.

Preferably, the mechanical-energy storage device is provided for the purpose of storing rotational energy. The mechanical-energy storage device comprises, in an especially preferred way, a flywheel.

In an especially preferred way, two ends of the spring that are, in particular, opposite each other, are movable, in order to tension the spring.

In an especially preferred way, the spring comprises two spring elements that are spaced apart from each other and are, in particular, mutually supported.

According to one aspect of the application, the energy-transfer mechanism comprises an energy-feeding mechanism for transferring energy from an energy source to the mechanical-energy storage device and a retracting mechanism that is separate from the energy-feeding mechanism and operates, in particular, independently, for transporting the energy-transfer element from the setting position into the starting position.

According to one aspect of the application, the device comprises a coupling mechanism for temporarily holding the energy-transfer element in the starting position. Preferably, the coupling mechanism is suitable for temporarily holding the energy-transfer element only in the starting position.

According to one aspect of the application, the device comprises an energy-transfer mechanism with a linear output that can move in a linear manner for transporting the energy-transfer element from the setting position into the starting position on the coupling mechanism.

According to one aspect of the application, the coupling mechanism is arranged on the setting axis or essentially symmetric about the setting axis.

According to one aspect of the application, the energy-transfer element and the linear output are arranged displaceable opposite the coupling mechanism, especially in the direction of the setting axis.

According to one aspect of the application, the device comprises a housing in which the energy-transfer element, the coupling mechanism and the energy-transfer mechanism are accommodated, wherein the coupling mechanism is fastened to the housing. Here it is guaranteed that, in particular, sensitive parts of the coupling mechanism are not exposed to the same acceleration forces as, for example, the energy-transfer element.

According to one aspect of the application, the spring comprises two spring elements that are spaced apart from each other and are supported, in particular, on opposite sides, wherein the coupling mechanism is arranged between the two spring elements spaced apart from each other.

According to one aspect of the application, the coupling mechanism comprises a locking element that can move perpendicular to the setting axis. Preferably, the locking element is ball-shaped. Preferably, the locking element has a metal and/or an alloy.

According to one aspect of the application, the coupling mechanism comprises an inner sleeve oriented along the setting axis with a recess running perpendicular to the setting axis for holding the locking element and an outer sleeve encompassing the inner sleeve with a support surface for supporting the locking element. Preferably, the support surface is inclined relative to the setting axis by an acute angle.

According to one aspect of the application, the linear output is arranged displaceable relative to the energy-transfer element, especially in the direction of the setting axis.

According to one aspect of the application, the coupling mechanism further comprises a restoring spring applying a force on the outer sleeve in the direction of the setting axis.

According to one aspect of the application, the device comprises a holding element, wherein, in a locked position of the holding element, the holding element holds the outer sleeve against the force of the restoring spring and wherein, in a released position of the holding element, the holding element releases a movement of the outer sleeve based on the force of the restoring spring.

Preferably, the energy-transfer element consists of a rigid body.

Preferably, the energy-transfer element has a coupling recess for receiving the locking element.

According to one aspect of the application, the energy-transfer element has a recess, wherein the force-transfer mechanism extends into the recess, in particular, both in the starting position of the energy-transfer element and also in the setting position of the energy-transfer element.

According to one aspect of the application, the recess is constructed as an opening and the force-transfer mechanism extends through the opening, in particular, both in the starting position of the energy-transfer element and also in the setting position of the energy-transfer element.

According to one aspect of the application, the force-transfer mechanism comprises a force diverter for diverting the direction of a force transferred by the force-transfer mechanism. Preferably, the force diverter extends into the recess or through the opening, in particular, both in the starting position of the energy-transfer element and also in the setting position of the energy-transfer element. Preferably, the force diverter is arranged movable relative to the mechanical-energy storage device and/or relative to the energy-transfer element.

According to one aspect of the application, the device comprises a coupling mechanism for temporarily fixing the energy-transfer element in the starting position and a tie rod for transferring a tension force from the energy-transfer mechanism, in particular, the linear output and/or the rotational drive onto the coupling mechanism.

According to one aspect of the application, the tie rod comprises a rotating bearing connected rigidly to the coupling mechanism and a rotating part connected rigidly to the rotational drive and supported in the rotating bearing so that it can rotate.

According to one aspect of the application, the force diverter comprises a belt.

According to one aspect of the application, the force diverter comprises a cord.

According to one aspect of the application, the force diverter comprises a chain.

According to one aspect of the application, the energy-transfer element further comprises a coupling plug-in part for temporarily coupling on a coupling mechanism.

According to one aspect of the application, the coupling plug-in part comprises a coupling recess for holding a locking element of the coupling mechanism.

According to one aspect of the application, the energy-transfer element comprises a shaft turned, in particular, toward the fastening element. Preferably, the shaft has a convexo-conical shaft section.

According to one aspect of the application, the recess, in particular, the opening, is arranged between the coupling plug-in part and the shaft.

According to one aspect of the application, the force-transfer mechanism, in particular, the force diverter, and the energy-transfer mechanism, in particular, the linear output, are mutually loaded with a force, while the energy-transfer element transfers energy to the fastening element.

According to one aspect of the application, the energy-transfer mechanism comprises a movement converter for converting a rotational movement into a linear movement with a rotational drive and a linear output and a force-transfer mechanism for transferring a force from the linear output to the energy storage device.

According to one aspect of the application, the force-transfer mechanism, in particular, the force diverter, in particular, the belt, is fastened to the energy-transfer mechanism, in particular, the linear output.

According to one aspect of the application, the energy-transfer mechanism, in particular, the linear output, comprises a passage, wherein the force-transfer mechanism, in particular, the force diverter, in particular, the belt, is guided through the passage and is fixed on a locking element that has, together with the force-transfer mechanism, in particular, the force diverter, in particular, the belt, an extent perpendicular to the passage that exceeds the dimensions of the passage perpendicular to the passage. Preferably, the locking element is constructed as a pin. According to another embodiment, the locking element is constructed as a ring.

According to one aspect of the application, the force-transfer mechanism, in particular, the force diverter, in particular, the belt, encompasses the locking element.

According to one aspect of the application, the force-transfer mechanism, in particular, the force diverter, in particular, the belt comprises a damping element. Preferably, the damping element is arranged between the locking element and the linear output.

According to one aspect of the application, the linear output comprises a damping element.

According to one aspect of the application, the belt comprises a plastic matrix interspersed with reinforcement fibers. Preferably, the plastic matrix comprises an elastomer. Preferably, the reinforcement fibers comprise a braid.

According to one aspect of the application, the belt comprises a woven fabric or non-crimp fabric of woven or non-crimp fibers. Preferably, the woven or non-crimp fibers comprise plastic fibers.

According to one aspect of the application, the woven fabric or non-crimp fabric comprises reinforcement fibers that differ from the woven or non-crimp fibers.

Preferably, the reinforcement fibers comprise glass fibers, carbon fibers, polyamide fibers, in particular, aramide fibers, metal fibers, in particular, steel fibers, ceramic fibers, basalt fibers, boron fibers, polyethylene fibers, in particular, high-performance polyethylene fibers (HPPE fibers), fibers made from liquid-crystalline polymers, in particular, polyesters, or mixtures thereof.

According to one aspect of the application, the device comprises a deceleration element for decelerating the energy-transfer element. Preferably, the deceleration element has a stop face for the energy-transfer element.

According to one aspect of the application, the device comprises a receiving element for receiving the deceleration element. Preferably, the receiving element comprises a first support wall for the axial support of the deceleration element and a second support wall for the radial support of the deceleration element. Preferably, the receiving element comprises a metal and/or an alloy.

According to one aspect of the application, the housing comprises a plastic and the receiving element is fastened to the drive mechanism only by means of the housing.

According to one aspect of the application, the housing comprises one or more first reinforcement ribs.

Preferably, the first reinforcement rib is suitable for transferring a force acting on the receiving element from the deceleration element onto the drive mechanism.

According to one aspect of the application, the deceleration element has a greater extent in the direction of the setting axis than the receiving element.

According to one aspect of the application, the device comprises a guide channel connecting to the receiving element for guiding the fastening element. Preferably, the guide channel is arranged displaceable on a guide rail. According to one aspect of the application, the guide channel or the guide rail is connected rigidly, in particular, monolithically, to the receiving element.

According to one aspect of the application, the receiving element is connected rigidly, in particular, screwed to the housing, in particular, to the first reinforcement rib.

According to one aspect of the application, the receiving element is supported on the housing in the setting direction.

According to one aspect of the application, the housing comprises a carrier element that projects into the interior of the housing, wherein the mechanical-energy storage device is fastened to the carrier element. Preferably, the carrier element comprises a flange.

According to one aspect of the application, the housing comprises one or more second reinforcement ribs connecting, in particular, to the carrier element. Preferably, the second reinforcement rib is connected rigidly to the carrier element, in particular, monolithically.

According to one aspect of the application, the housing comprises a first housing shell, a second housing shell, and a housing seal. Preferably, the housing seal seals the first housing shell relative to the second housing shell.

According to one aspect of the application, the first housing shell has a first material thickness and the second housing shell has a second material thickness, wherein the housing seal has a seal material thickness that differs from the first and/or second material thickness.

Device, wherein the first housing shell comprises a first housing material and the second housing shell comprises a second housing material, and wherein the housing seal comprises a sealing material that differs from the first and/or the second housing material.

According to one aspect of the application, the housing seal comprises an elastomer.

According to one aspect of the application, the first and/or the second housing shell has a groove in which the housing seal is arranged.

According to one aspect of the application, the housing seal is connected to the first and/or the second housing shell with a material fit.

According to one aspect of the application, the piston seal seals the guide channel relative to the energy-transfer element.

According to one aspect of the application, the device comprises a pressing mechanism, in particular, with a contact-pressing sensor for identifying the distance of the device to the substrate and a contact-pressing sensor seal. Preferably, the contact-pressing sensor seal seals the contact-pressing mechanism, in particular, the contact-pressing sensor, relative to the first and/or second housing shell.

According to one aspect of the application, the piston seal and/or the contact-pressing sensor seal has a circular-ring shape.

According to one aspect of the application, the piston seal and/or the contact-pressing sensor seal comprises a bellows.

According to one aspect of the application, the device comprises a contact element for the electrical connection of an electrical-energy storage device to the device, a first electrical line for connecting the electrical motor to the motor control mechanism, and a second electrical line for connecting the contact element to the motor control mechanism, wherein the first electrical line is longer than the second electrical line.

Preferably, the motor control mechanism supplies the motor with electrical power via the first electrical line in commutated phases.

According to one aspect of the application, the device comprises a grip for gripping the device by a user. Preferably, the housing and the control housing are arranged on opposite sides of the grip.

According to one aspect of the application, the housing and/or the control housing connects to the grip.

According to one aspect of the application, the device comprises a grip sensor for identifying a gripping and release of the grip by a user.

Preferably, the control mechanism is provided for the purpose of emptying the mechanical-energy storage device as soon as a release of the grip by the user is identified by means of the grip sensor.

According to one aspect of the application, the grip sensor comprises a switching element that sets the control mechanism into a ready mode and/or into a turned-off state as long as the grip is released and sets the control mechanism in a normal mode as long as the grip is gripped by a user.

The switching element is preferably a mechanical switch, in particular, a galvanic closing switch, a magnetic switch, an electronic switch, and, in particular, electronic sensor, or a non-contact proximity switch.

According to one aspect of the application, the grip has a gripping surface that is grasped by one hand of the user when the grip is gripped by the user, and wherein the grip sensor, in particular, the switching element, is arranged on the gripping surface.

According to one aspect of the application, the grip has a trigger switch for triggering the driving of the fastening element into the substrate and the grip sensor, in particular, the switching element, wherein the trigger switch is provided for actuation with the pointer finger and the grip sensor, in particular, the switching element, is provided for actuation with the middle finger, the ring finger and/or the pinky finger of the same hand as that of the pointer finger.

According to one aspect of the application, the grip has a trigger switch for triggering the driving of the fastening element into the substrate and wherein the trigger switch for actuation with the pointer finger and the grip sensor, in particular, the switching element, is provided for actuation with the palm and/or the heel of the same hand as that of the pointer finger.

According to one aspect of the application, the drive mechanism comprises a torque-transfer mechanism for transferring a torque from the motor output to the rotational drive. Preferably, the torque-transfer mechanism comprises a motor-side rotating element to a first rotational axis and a movement-converter-side rotating element with a second rotational axis offset parallel relative to the first rotational axis, wherein a rotation of the motor-side rotating element directly causes a rotation of the movement-converter-side rotating element about the first axis. Preferably, the motor-side rotating element is immovable relative to the motor output and is arranged displaceable along the first rotational axis relative to the movement-converter-side rotating element. Through the decoupling of the motor-side rotating element from the movement-converter-side rotating element, the motor-side rotating element is impact-decoupled together with the motor from the movement-converter-side rotating element together with the movement converter.

According to one aspect of the application, the motor-side rotating element is arranged locked in rotation relative to the motor output and is constructed, in particular, as a motor pinion.

According to one aspect of the application, the torque-transfer mechanism comprises one or more additional rotating elements that transfer a torque from the motor output to the motor-side rotating element, and wherein one or more rotating axes of the rotating element or the additional rotating elements are arranged offset relative to a rotational axis of the motor output and/or relative to the first rotational axis. The rotating element or the additional rotating elements are then impact-decoupled together with the motor from the movement converter.

According to one aspect of the application, the movement-converter-side rotating element is arranged locked in rotation relative to the rotational drive.

According to one aspect of the application, the torque-transfer mechanism comprises one or more additional rotating elements that transfer a torque from the movement-converter-side rotating element to the rotational drive and wherein one or more rotational axes of the rotating element or the additional rotating elements are arranged offset relative to the second rotational axis and/or relative to a rotational axis of the rotational drive.

According to one aspect of the application, the motor-side rotating element has motor-side teeth and the movement-converter-side rotating element has drive-element-side teeth. Preferably, the motor-side teeth and/or the drive-element-side teeth run in the direction of the first rotational axis.

According to one aspect of the application, the drive mechanism comprises a motor-damping element that is suitable for absorbing movement energy, in particular, vibration energy, of the motor relative to the movement converter.

The motor-damping element preferably comprises an elastomer.

According to one aspect of the application, the motor-damping element is arranged on the motor, in particular, in a ring shape around the motor.

According to one aspect of the application, the drive mechanism comprises a holding mechanism that is suitable for fixing the motor output relative to rotation.

According to one aspect of the application, the motor-damping element is arranged on the holding mechanism, in particular, in a ring shape around the holding mechanism.

Preferably, the motor-damping element is fastened to the motor and/or the holding mechanism, in particular, with a material fit. In an especially preferred way, the motor-damping element is vulcanized on the motor and/or the holding mechanism.

Preferably, the motor-damping element is arranged on the housing. In an especially preferred way, the housing has an, in particular, ring-shaped assembly element on which the motor-damping element is arranged, in particular, is fastened. In an especially preferred way, the motor-damping element is vulcanized on the assembly element.

According to one aspect of the application, the motor-damping element seals the motor and/or the holding mechanism relative to the housing.

According to one aspect of the application, the motor comprises a motor-side tension-relief element with which the first electrical line is fastened on the motor spaced apart from the electrical connection.

According to one aspect of the application, the housing comprises a housing-side tension-relief element with which the first electrical line is fastened to the housing.

According to one aspect of the application, the housing comprises a motor guide for guiding the motor in the direction of the first rotational axis.

According to one aspect of the application, the holding mechanism is provided to be moved on the rotating element, in particular, in the direction of the rotational axis, in order to fix the rotating element relative to rotation.

According to one aspect of the application, the holding mechanism can be actuated electrically. Preferably, the holding mechanism exerts a holding force on the rotating element when an electrical voltage is applied and releases the rotating element when the electrical voltage is removed, the rotating element.

According to one aspect of the application, the holding mechanism comprises a magnet coil.

According to one aspect of the application, the holding mechanism fixes the rotating element by means of a friction fit.

According to one aspect of the application, the holding mechanism comprises a wrap spring coupling.

According to one aspect of the application, the holding mechanism fixes the rotating element by means of a positive fit.

According to one aspect of the application, the energy-transfer mechanism comprises a motor with a motor output that is connected to the mechanical-energy storage device in an uninterruptible and force-coupled manner. A movement of the motor output causes a charging or discharging of the energy storage device and vice versa. The flow of forces between the motor output and the mechanical-energy storage device cannot be interrupted, for example, by means of a coupling.

According to one aspect of the application, the energy-transfer mechanism comprises a motor with a motor output that is connected to the rotational drive in an uninterruptible and torque-coupled manner. A rotation of the motor output causes a rotation of the rotational drive and vice versa. The torque flow between the motor output and the rotational drive cannot be interrupted, for example, by means of a coupling.

According to one aspect of the application, the device comprises a guide channel for guiding the fastening element, a contact-pressing mechanism arranged displaceable relative to the guide channel in the direction of the setting axis, in particular, with a contact-pressing sensor, for identifying the distance of the device to the substrate in the direction of the setting axis, a locking element that allows, in a released position of the locking element, a displacement of the contact-pressing mechanism and prevents, in a locked position of the locking element, a displacement of the contact-pressing mechanism and an unlocking element that can be actuated from the outside and holds, in an unlocked position of the unlocking element, the locking element in the released position of the locking element and allows, in a waiting position of the unlocking element, a movement of the locking element into the locked position.

According to one aspect of the application, the contact-pressing mechanism allows a transfer of energy to the fastening element only when the contact-pressing mechanism identifies a distance of the device to the substrate in the direction of the setting axis that does not exceed a specified maximum value.

According to one aspect of the application, the device comprises an engaging spring that moves the locking element into the locked position.

According to one aspect of the application, the guide channel comprises a launching section, wherein a fastening element arranged in the launching section holds the locking element in the released position, in particular, against a force of the engaging spring. Preferably, the launching section is provided for the reason that the fastening element that is designed to be driving into the substrate is located in the launching section.

Preferably, the guide channel, in particular, in the launching section, has a feed recess, in particular, a feed opening through which a fastening element can be fed to the guide channel.

According to one aspect of the application, the device comprises a feed mechanism for feeding fastening element to the guide channel. Preferably, the feed mechanism is constructed as a magazine.

According to one aspect of the application, the feed mechanism comprises an advancing spring that holds a fastening element arranged in the launching section in the guide channel. Preferably, the spring force of the advancing spring acting on the fastening element arranged in the launching section is greater than the spring force of the engaging spring acting on the same fastening element.

According to one aspect of the application, the feed mechanism comprises an advancing element loaded against the guide channel by the advancing spring. Preferably, the advancing element can be actuated from the outside by a user, in particular, displaceable, in order to bring fastening elements into the feed mechanism.

According to one aspect of the application, the device comprises a disengaging spring that moves the unlocking element into the waiting position.

Preferably, the locking element can be moved back and forth in a first direction between the released position and the locked position and wherein the unlocking element can be moved back and forth in a second direction between the unlocked position and the waiting position.

According to one aspect of the application, the advancing element can be moved back and forth in the first direction.

Preferably, the first direction is inclined relative to the second direction, in particular, at a right angle.

According to one aspect of the application, the locking element comprises a first displacement surface that is inclined at an acute angle relative to the first direction and faces the unlocking element.

According to one aspect of the application, the unlocking element comprises a second displacement surface that is inclined at an acute angle relative to the second direction and faces the locking element.

According to one aspect of the application, the advancing element comprises a third displacement surface that is inclined at an acute angle relative to the first direction and faces the unlocking element.

According to one aspect of the application, the unlocking element comprises a fourth displacement surface that is inclined at an acute angle relative to the second direction and faces the advancing element.

According to one aspect of the application, the unlocking element comprises a first catch element, and the advancing element comprises a second catch element, wherein the first and the second catch element engage with each other when the unlocking element is moved into the unlocked position.

According to one aspect of the application, the advancing element can be moved away from the guide channel from the outside by a user, in particular, can be tensioned against the advancing spring, in order to fill fastening elements into the feed mechanism.

According to one aspect of the application, the engagement between the unlocking element and the advancing element is detached when the advancing element is moved away from the guide channel.

According to one aspect of the application, in a method for using the device, the motor is operated with decreasing rotational speed against a load torque that is exerted by the mechanical-energy storage device on the motor. In particular, the load torque becomes greater the more energy is stored in the mechanical-energy storage device.

According to one aspect of the application, the motor is initially operated during a first time period with increasing rotational speed against the load torque and then during a second time period with constantly decreasing rotational speed against the load torque, wherein the second time period is longer than the first time period.

According to one aspect of the application, the largest possible load torque is greater than the largest possible motor torque that can be exerted by the motor.

According to one aspect of the application, the motor is supplied with decreasing energy while energy is being stored in the mechanical-energy storage device.

According to one aspect of the application, the rotational speed of the motor is reduced, while energy is stored in the mechanical-energy storage device.

According to one aspect of the application, the motor is provided to be operated with decreasing rotational speed against a load torque that is exerted by the mechanical-energy storage device on the motor.

According to one aspect of the application, the motor control device is suitable for supplying the motor with decreasing energy or for reducing the rotational speed of the motor while the motor is operating for storing energy in the mechanical-energy storage device.

According to one aspect of the application, the device comprises an intermediate energy storage device that is provided for temporarily storing energy output by the motor and for outputting it to the mechanical-energy storage device while the motor is operating for storing energy in the mechanical-energy storage device.

Preferably, the intermediate energy storage device is provided for storing rotational energy. In particular, the intermediate energy storage device is a flywheel.

According to one aspect of the application, the intermediate energy storage device, in particular, the flywheel is connected locked in rotation with the motor output.

According to one aspect of the application, the intermediate energy storage device, in particular, the flywheel, is accommodated in a motor housing of the motor.

According to one aspect of the application, the intermediate energy storage device, in particular, the flywheel, is arranged outside of a motor housing of the motor.

According to one aspect of the application, the deceleration element comprises a stop element made from a metal and/or an alloy with a stop face for the energy-transfer element and an impact-damping element made from an elastomer.

According to one aspect of the application, the mass of the impact-damping element equals at least 15%, preferably at least 20%, especially preferred at least 25%, of the mass of the impact element. In this way, an increase in the service life of the impact-damping element with simultaneous weight savings is possible.

According to one aspect of the application, the mass of the impact-damping element equals at least 15%, preferably at least 20%, especially preferred at least 25%, of the mass of the energy-transfer element. In this way, an increase in the service life of the impact-damping element with simultaneous weight savings is likewise possible.

According to one aspect of the application, a ratio of the mass of the impact-damping element to the maximum kinetic energy of the energy-transfer element equals at least 0.15 g/J, preferably at least 0.20 g/J, especially preferred at least 0.25 g/J. In this way, an increase in the service life of the impact-damping element with simultaneous weight savings is likewise possible.

According to one aspect of the application, the impact-damping element is connected to the stop element with a material fit, in particular, is vulcanized onto the stop element.

According to one aspect of the application, the elastomer comprises HNBR, NBR, NR, SBR, IIR and/or CR.

According to one aspect of the application, the elastomer has a Shore hardness that equals at least 50 Shore A.

According to one aspect of the application, the alloy comprises, in particular, a hardened steel.

According to one aspect of the application, the metal, in particular, the alloy, has a surface hardness that equals at least 30 HRC.

According to one aspect of the application, the stop face comprises a concavo-conical section. Preferably, the cone of the concavo-conical section agrees with the cone of the convexo-conical section of the energy-transfer element.

According to one aspect of the application, in a method, the motor is initially operated in a restoring direction in a rotational speed-regulated and essentially load-free manner and then in a tensioning direction in a current intensity-regulated manner, in order to transfer energy to the mechanical-energy storage device.

Preferably, the energy source is formed by an electrical-energy storage device.

According to one aspect of the application, a desired current intensity is defined according to specified criteria before operation of the motor in the tensioning direction.

Preferably, the specified criteria comprise a load state and/or a temperature of the electrical-energy storage device and/or an operating period and/or an age of the device.

According to one aspect of the application, the motor is provided to be operated essentially load-free in a tensioning direction against the load torque and in a restoring direction opposite the tensioning direction. Preferably, the motor control mechanism is provided for controlling the current intensities received by the motor to a specified desired current intensity for rotation of the motor in the tensioning direction and to control the rotational speed of the motor to a specified desired rotational speed when the motor rotates in the restoring direction.

According to one aspect of the application, the device comprises the energy source.

According to one aspect of the application, the energy source is formed by an electrical-energy storage device.

According to one aspect of the application, the motor control mechanism is suitable for determining the specified desired current intensities according to specified criteria.

According to one aspect of the application, the device comprises a safety mechanism through which the electrical energy source can be or is coupled with the device such that the mechanical-energy storage device is automatically relaxed when the electrical energy source is separated from the device. Preferably, the energy stored in the mechanical-energy storage device is discharged in a controlled manner.

According to one aspect of the application, the device comprises a holding mechanism that holds stored energy in the mechanical-energy storage device and automatically releases a discharge of the mechanical-energy storage device when the electrical energy source is separated from the device.

According to one aspect of the application, the safety mechanism comprises an electromechanical actuator that automatically unlocks a locking mechanism that holds stored energy in the mechanical-energy storage device when the electrical energy source is separated from the device.

According to one aspect of the application, the device comprises a coupling and/or braking mechanism, in order to discharge energy stored in the mechanical-energy storage device in a controlled way when the mechanical-energy storage device is discharged.

According to one aspect of the application, the safety mechanism comprises at least one safety switch that short-circuits phases of the electrical drive motor, in order to discharge energy stored in the mechanical-energy storage device in a controlled manner when the mechanical-energy storage device is discharged. Preferably, the safety switch is constructed as a self-governing electronic switch, in particular, as a J-FET.

According to one aspect of the application, the motor comprises three phases and is controlled by a 3-phase motor bridge circuit with freewheeling diodes that rectify a voltage generated during discharging of the mechanical-energy storage device.

BRIEF DESCRIPTION OF THE SEVERAL VIEWS OF THE DRAWINGS

Below, embodiments of a device for driving a fastening element into a substrate will be explained in detail using examples with reference to the drawings. Shown are:

FIG. 22, a side view of a deceleration element;
FIG. 23, a longitudinal section of a deceleration element;
FIG. 24, a partial view of a driving device;
FIG. 26, a partial view of a contact-pressing mechanism;
FIG. 27, a partial view of a contact-pressing mechanism;
FIG. 28, a partial view of a contact-pressing mechanism;
FIG. 38, a switching diagram of a driving device.

DETAILED DESCRIPTION OF THE INVENTION

Figure 1:
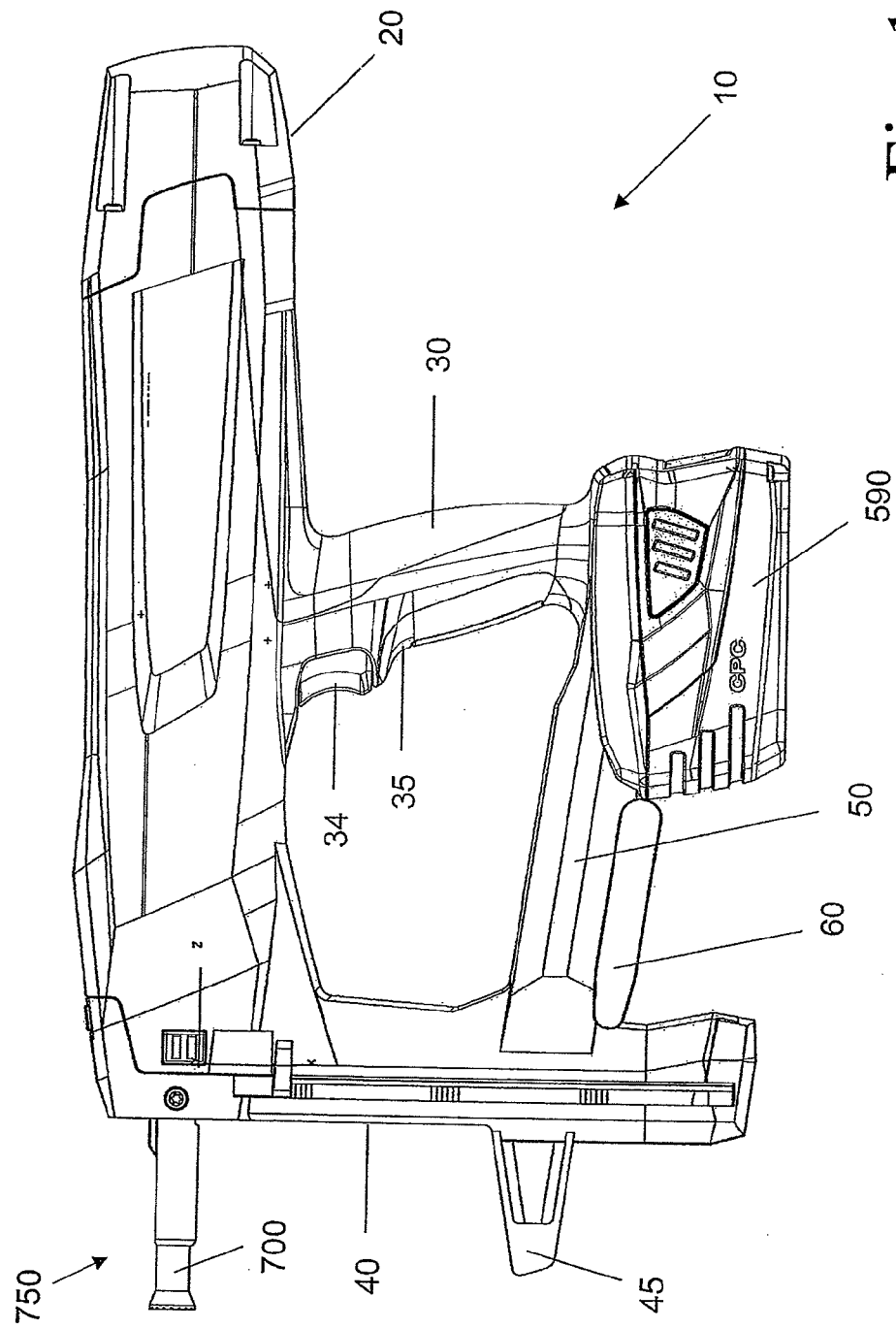
FIG. 1, a side view of a driving device.

FIG. 1 shows a driving device 10 for driving a fastening element, for example, a nail or bolt, into a substrate in a side view. The driving device 10 has a not-shown energy-transfer element for transferring energy to the fastening element as well as a housing 20 in which the energy-transfer element and a similarly not-shown driving device are accommodated for transporting the energy-transfer element.

The driving device 10 further has a grip 30, a magazine 40 and a bridge 50 connecting the grip 30 to the magazine 40. The magazine is non-removable. A frame hook 60 for hanging the driving device 10 on a frame or the like and an electrical-energy storage device constructed as accumulator 590 are fastened to the bridge 50. A trigger 34 and also a grip sensor constructed as a hand switch 35 are arranged on the grip 30. The driving device 10 further has a guide channel 700 for guiding the fastening element and a contact-pressing mechanism 750 for identifying a distance of the driving device 10 from a not-shown substrate. An alignment of the driving device perpendicular to a substrate is supported by an alignment aid 45.

Figure 2:
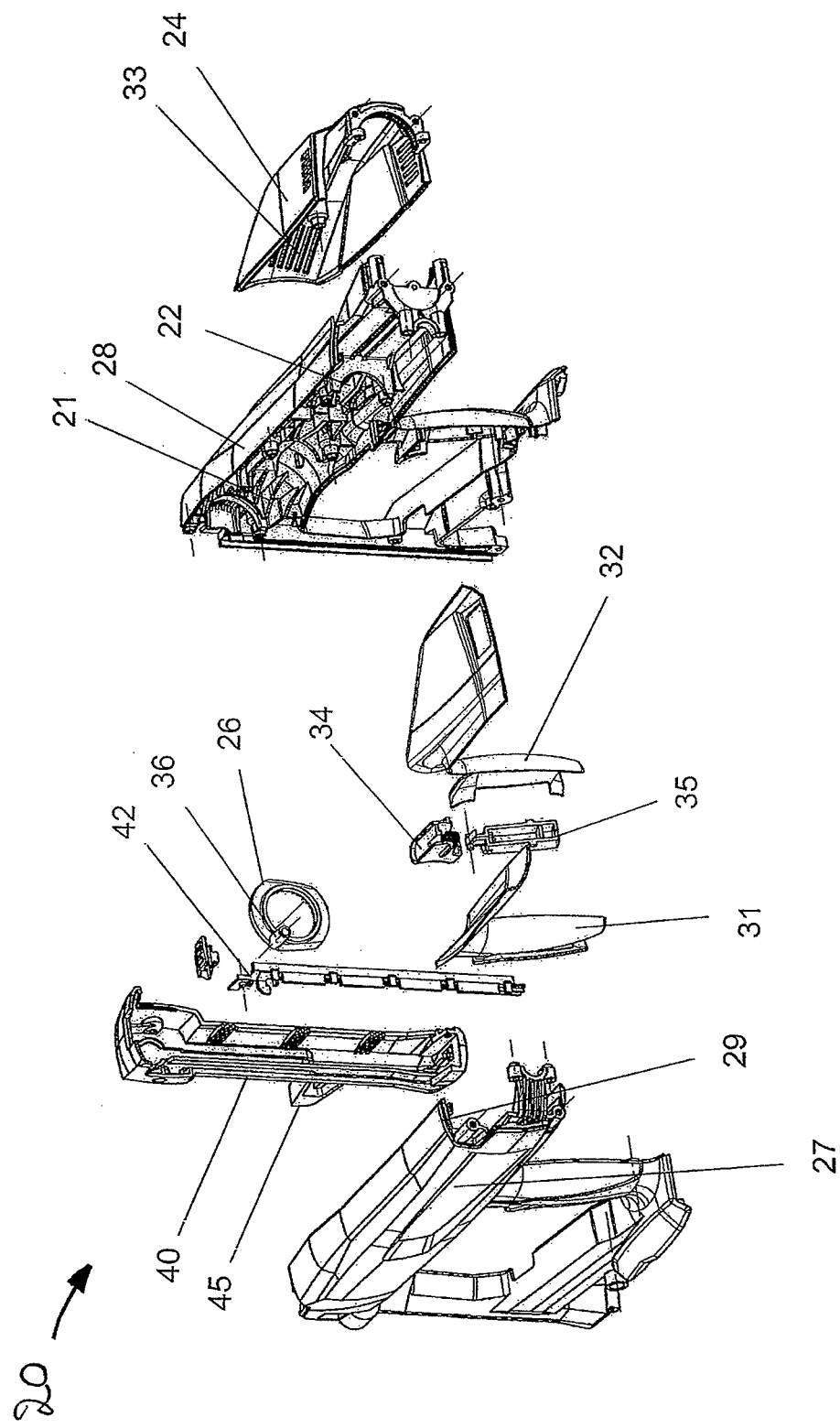
FIG. 2, an exploded view of a housing.

FIG. 2 shows the housing 20 of the driving device 10 in an exploded view. The housing 20 has a first housing shell 27, a second housing shell 28 and also a housing seal 29 that seals the first housing shell 27 against the second housing shell 28, so that the interior of the housing 20 is protected from dust and the like. In a not-shown embodiment, the housing seal 29 is produced from an elastomer and is injection-molded onto the first housing shell 27.

For reinforcement against impact forces during the driving of a fastening element into a substrate, the housing has reinforcement ribs 21 and second reinforcement ribs 22. A retaining ring 26 is used for holding a not-shown deceleration element that is accommodated in the housing 20. The retaining ring 26 is advantageously produced from plastic, in particular, injection-molded, and is part of the housing. The retaining ring 26 has a contact-pressing guide 36 for guiding a not-shown connecting rod of a contact-pressing mechanism.

The housing 20 further has a motor housing 24 with ventilation slots for holding a not-shown motor and a magazine 40 with a magazine rail 42. In addition, the housing 20 has a grip 30 that comprises a first grip surface 31 and a second grip surface 32. The two grip surfaces 31, 32 are advantageously films made from plastic injection-molded onto the grip 30. A trigger 34 and also a grip sensor formed as a hand switch 35 are arranged on the grip 30.

Figure 3:
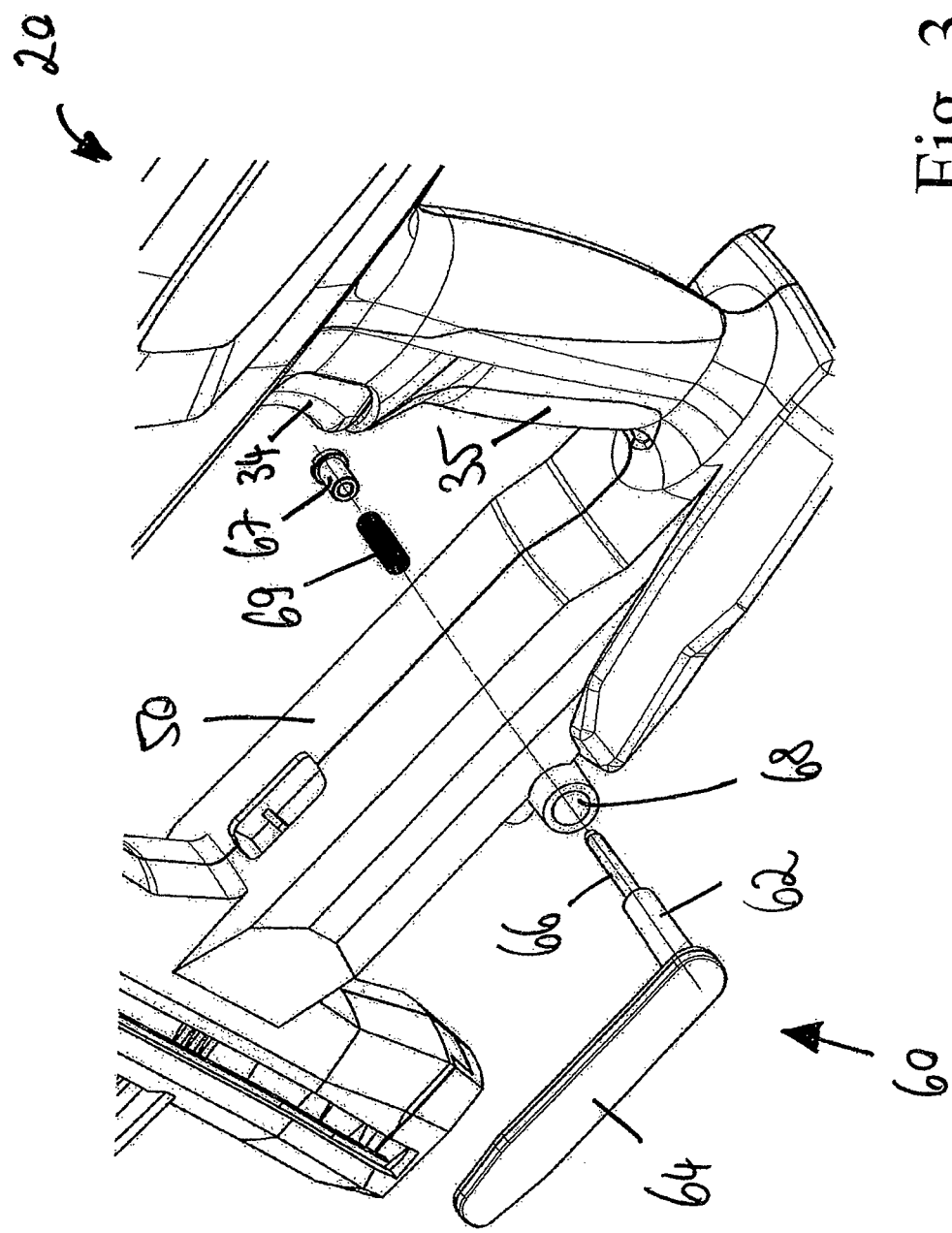
FIG. 3, an exploded view of a frame hook.

FIG. 3 shows a frame hook 60 with a spacer 62 and a retaining element 64 that has a pin 66 fastened in a bridge opening 68 of the bridge 50 of the housing. A screw sleeve 67 that is secured against loosening by a retaining spring 69 is used for fastening. The frame hook 60 is provided to be suspended with the retaining element 64 in a frame brace or the like, in order to suspend the driving device 10 on a frame or the like, for example, during working breaks.

Figure 4:
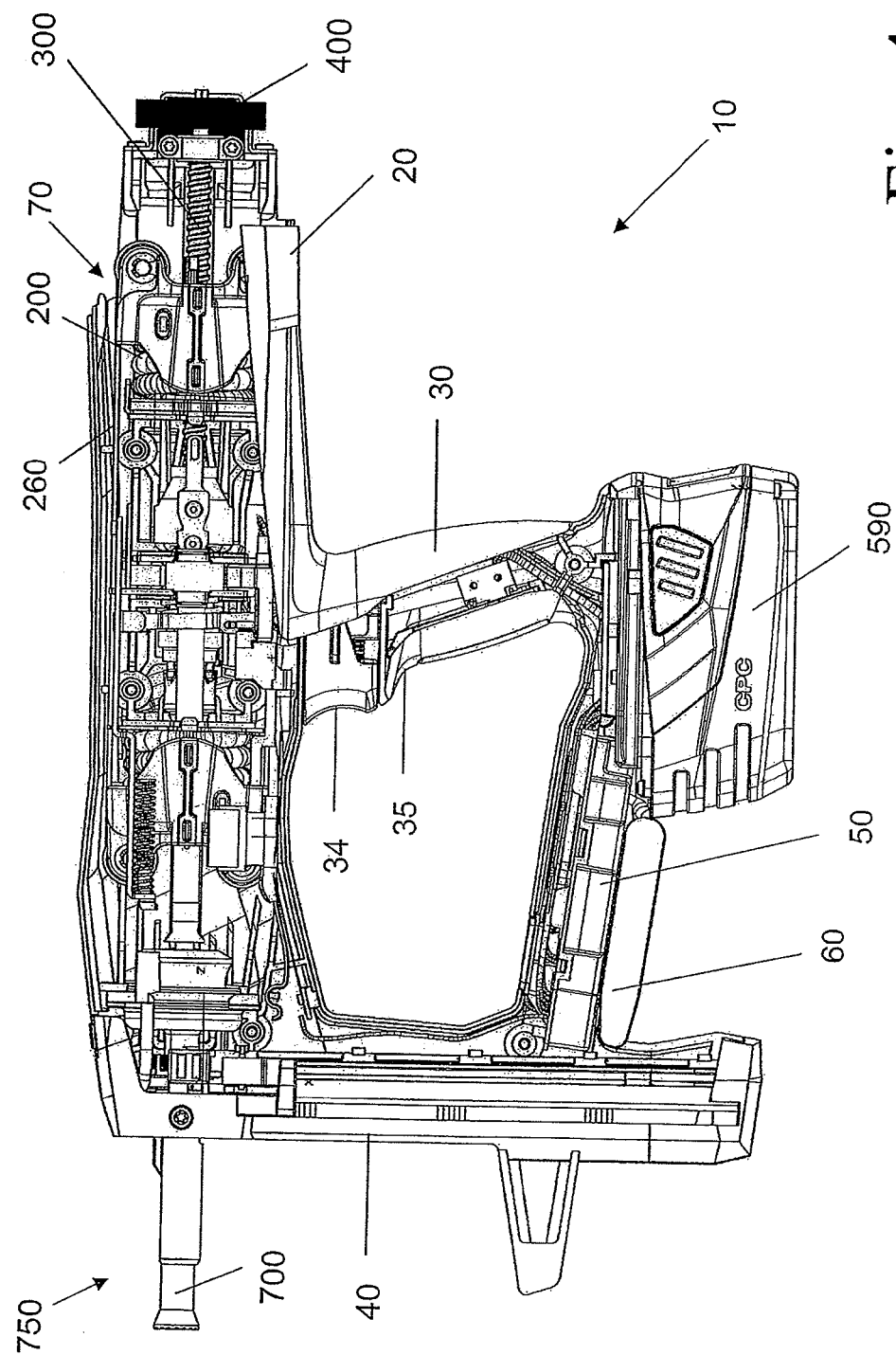
FIG. 4, a side view of a driving device with opened housing.

FIG. 4 shows the driving device 10 with opened housing 20. In the housing 20, a driving mechanism 70 is accommodated for transporting an energy-transfer element covered in the drawing. The driving mechanism 70 comprises a not-shown electric motor for converting electrical energy from the accumulator 590 into rotational energy, a torque-transfer mechanism comprising a transmission 400 for transferring a torque of the electric motor to a movement converter formed as a spindle drive 300, a force-transfer mechanism comprising a roll train 260 for transferring a force from the movement converter to a mechanical-energy storage device formed as spring 200 and for transferring a force from the spring to the energy-transfer element.

Figure 5:
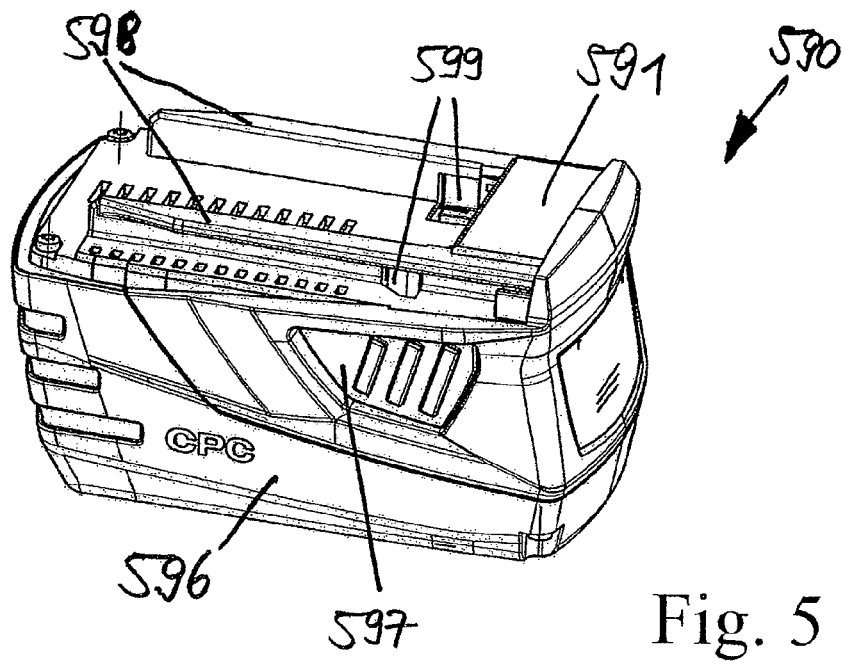
FIG. 5, a perspective view of an electrical-energy storage device.

FIG. 5 shows the electrical-energy storage device formed as an accumulator 590 in a perspective view. The accumulator 590 has an accumulator housing 596 with a recessed grip 597 for improved gripability of the accumulator 590. The accumulator 590 further has two retaining rails 598 with which the accumulator 590 can be inserted similar to a sled into not-shown, corresponding retaining grooves of a housing. For an electrical connection, the accumulator 590 has not-shown accumulator contacts that are arranged under a contact cover 591 protecting from splashed water.

Figure 6:
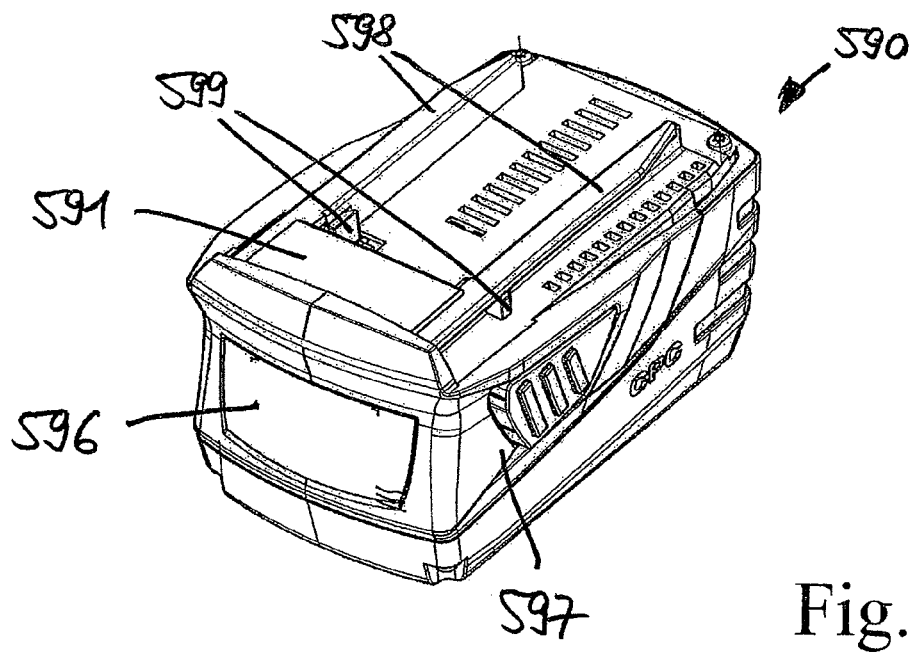
FIG. 6, a perspective view of an electrical-energy storage device.

FIG. 6 shows the accumulator 590 in another perspective view. On the retaining rails 598, catch tabs 599 are provided that prevent the accumulator 590 from falling out of the housing. As soon as the accumulator 590 has been inserted into the housing, the catch tabs 599 are pushed and locked to the side against a spring force by a corresponding geometry of the grooves. Through compression of the recessed grips, the locking is detached, so that the accumulator 590 can be removed from the housing by a user with the help of the thumb and fingers of one hand.

Figure 7:
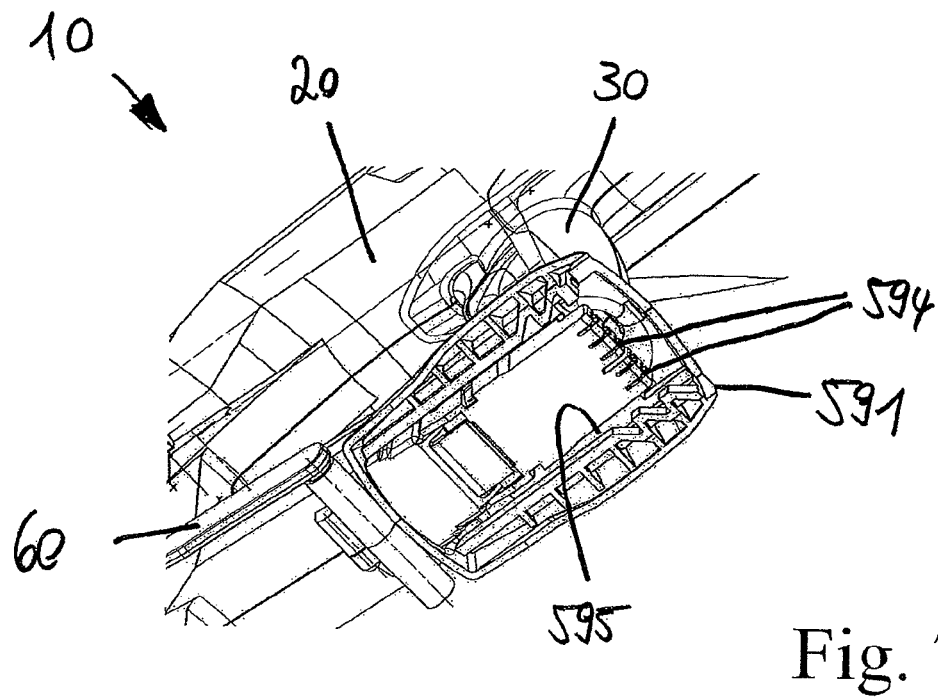
FIG. 7, a partial view of a driving device.

FIG. 7 shows the driving device 10 with the housing 20 in a partial view. The housing 20 has a grip 30 and also a bridge 50 projecting essentially at a right angle from the grip at its end with a frame hook 60 fastened to this bridge. The housing 20 further has an accumulator receptacle 591 for holding an accumulator. The accumulator receptacle 591 is arranged on the end of the grip 30 from which the bridge projects.

The accumulator receptacle 591 has two retaining grooves 595 in which not-shown, corresponding retaining rails of an accumulator can be inserted. For an electrical connection of the accumulator, the accumulator receptacle 591 has several contact elements that are formed as device contacts 594 and comprise power contact elements and communications contact elements. The accumulator receptacle 591 is suitable, for example, for holding the accumulator shown in FIGS. 5 and 6.

Figure 8:
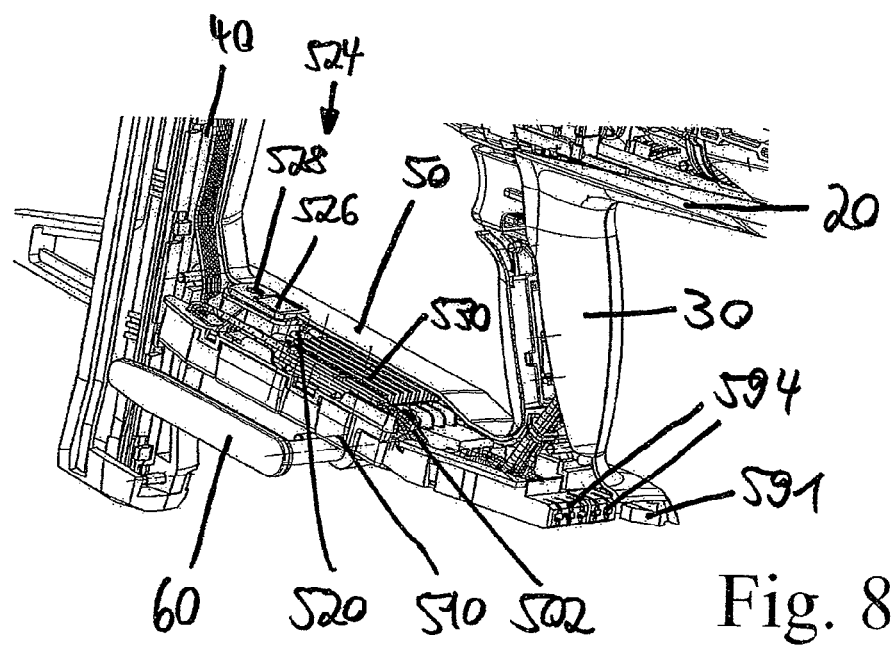
FIG. 8, a partial view of a driving device.

FIG. 8 shows the driving device 10 with opened housing 20 in a partial view. In the bridge 50 of the housing 20 that connects the grip 30 to the magazine 40, a control mechanism 500 is arranged that is accommodated in a control housing 510. The control mechanism comprises power electronics 520 and a cooling element 530 for cooling the control mechanism, in particular, the power electronics 520.

The housing 20 has an accumulator receptacle 591 with device contacts 594 for an electrical connection of a not-shown accumulator. An accumulator held in the accumulator receptacle 591 is connected electrically by means of accumulator lines 502 to the control mechanism 500 and thus provides the driving device 10 with electrical energy.

The housing 20 further has a communications interface 524 with a display 526 that is visible for a user of the device and an advantageously optical data interface 528 for an optical data exchange with a read-out device.

Figure 9:
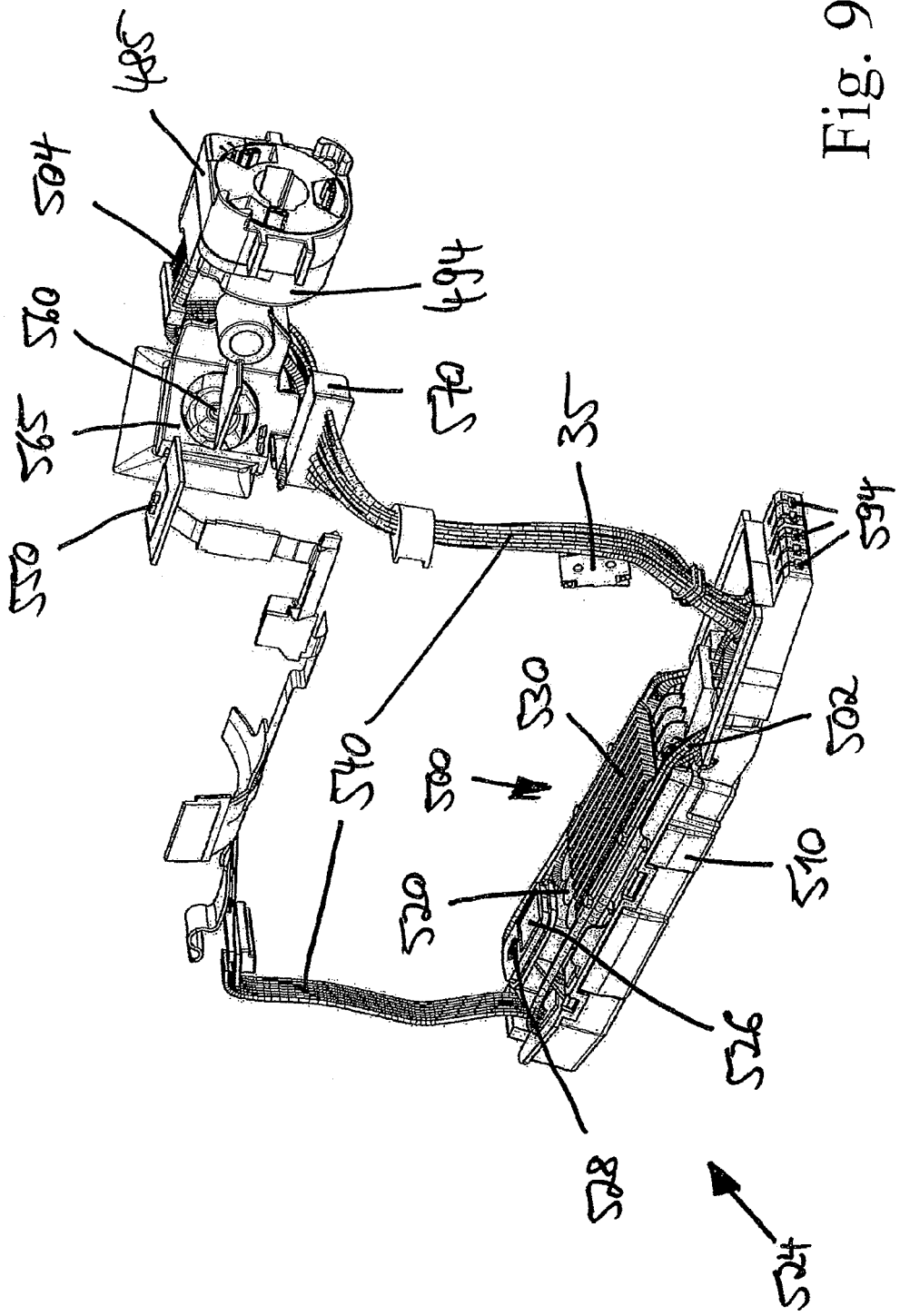
FIG. 9, a perspective view of a control mechanism with wiring.

FIG. 9 shows the control mechanism 500 and the wiring going out from the control mechanism 500 in a driving device in a perspective view. The control mechanism 500 is held with the power electronics 520 and the cooling element 530 in the control housing 510. The control mechanism 500 is connected by means of accumulator lines 502 to device contacts 594 for an electrical connection of a not-shown accumulator.

Cable strands 540 are used for the electrical connection of the control mechanism 500 to a plurality of components of the driving device, such as, for example, motors, sensors, switches, interfaces, or display elements. For example, the control mechanism 500 is connected to the contact-pressing sensor 550, the hand switch 35, a fan drive 560 of a fan 565 and by means of phase lines 504 and a motor retainer 485 to a not-shown electric motor that is held by the motor retainer.

In order to protect a contact of the phase lines 504 from damage due to movements of the motor 480, the phase lines 504 are fixed in a motor-side tension-relieving element 494 and in a housing-side tension-relieving element hidden in the drawing, wherein the motor-side tension-relieving element is fastened directly or indirectly to the motor retainer 485 and the housing-side tensioning-relieving element is fastened directly or indirectly to a not-shown housing of the driving device, in particular, a motor housing of the motor.

The motor, the motor retainer 485, the tension-relieving elements 494, the fan 565 and the fan drive 560 are accommodated in the motor housing 24 from FIG. 2. The motor housing 24 is sealed, in particular, against dust, relative to the rest of the housing by means of the line seal 570.

Because the control mechanism 500 is arranged on the same side of the not-shown grip as the device contacts 594, the accumulator lines 502 are shorter than the phase lines 504 running through the grip. Because the accumulator lines transport a greater current intensity and have a greater cross section than the phase lines, shortening of the accumulator lines at the cost of lengthening the phase lines is advantageous overall.

Figure 10:
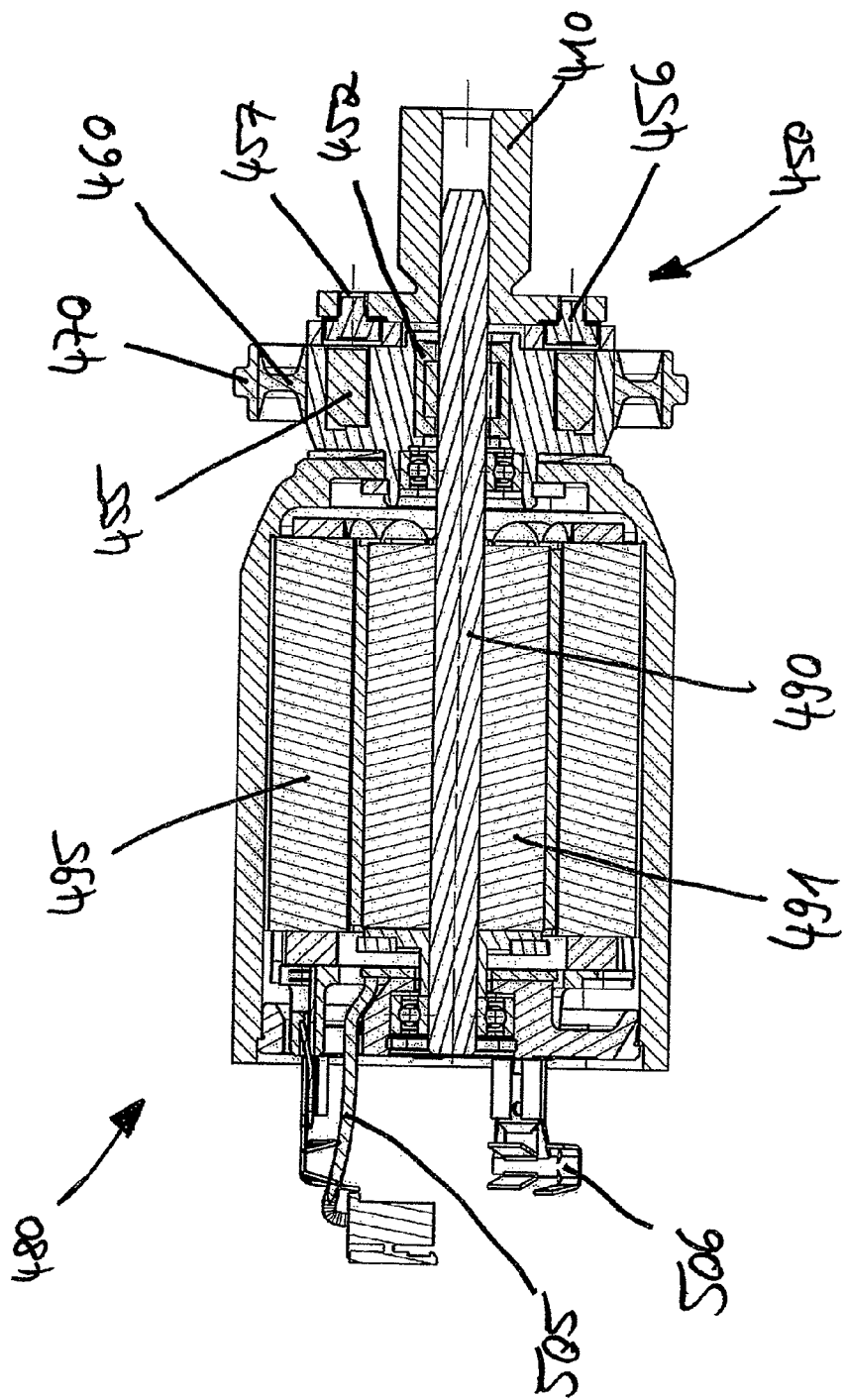
FIG. 10, a longitudinal section of an electric motor.

FIG. 10 shows an electrical motor 480 with a motor output 490 in a longitudinal section. The motor 480 is constructed as a brush-less direct-current motor and has motor coils 495 for driving the motor output 490 that comprises a permanent magnet 491. The motor 480 is held by a not-shown motor retainer and supplied with electrical energy by means of crimp contacts 506 and controlled by means of the control line 505.

On the motor output 490, a motor-side rotating element constructed as a motor pinion 410 is fastened locked in rotation by a press fit. The motor pinion 410 is driven by the motor output 490 and drives, on its side, a not-shown torque-transfer mechanism. A retaining mechanism 450 is supported, on one hand, by means of a bearing 452 on the motor output 490 so that it can rotate and is attached, on the other hand, locked in rotation by means of a ring-shaped assembly element 470 on the motor housing. Between the retaining mechanism 450 and the assembly element 470, there is a similarly ring-shaped motor damping element 460 that is used for damping relative movements between the motor 480 and the motor housing.

Advantageously, the motor damping element 460 is used alternatively or simultaneously with respect to the seal against dust and the like. Together with the line seal 570, the motor housing 24 is sealed relative to the rest of the housing, wherein the fan 565 draws air for cooling the motor 480 through the ventilation slots 33 and the rest of the drive mechanism is protected from dust.

The retaining mechanism 450 has a magnetic coil 455 that exerts a force of attraction on one or more magnetic armatures 456 when energized. The magnetic armatures 456 extend into armature recesses 457 of the motor pinion 410 formed as openings and are thus arranged locked in rotation on the motor pinion 410 and thus on the motor output 490. Due to the force of attraction, the magnetic armatures 456 are pressed against the retaining mechanism 450, so that a rotational movement of the motor output 490 is braked or prevented relative to the motor housing.

Figure 11:
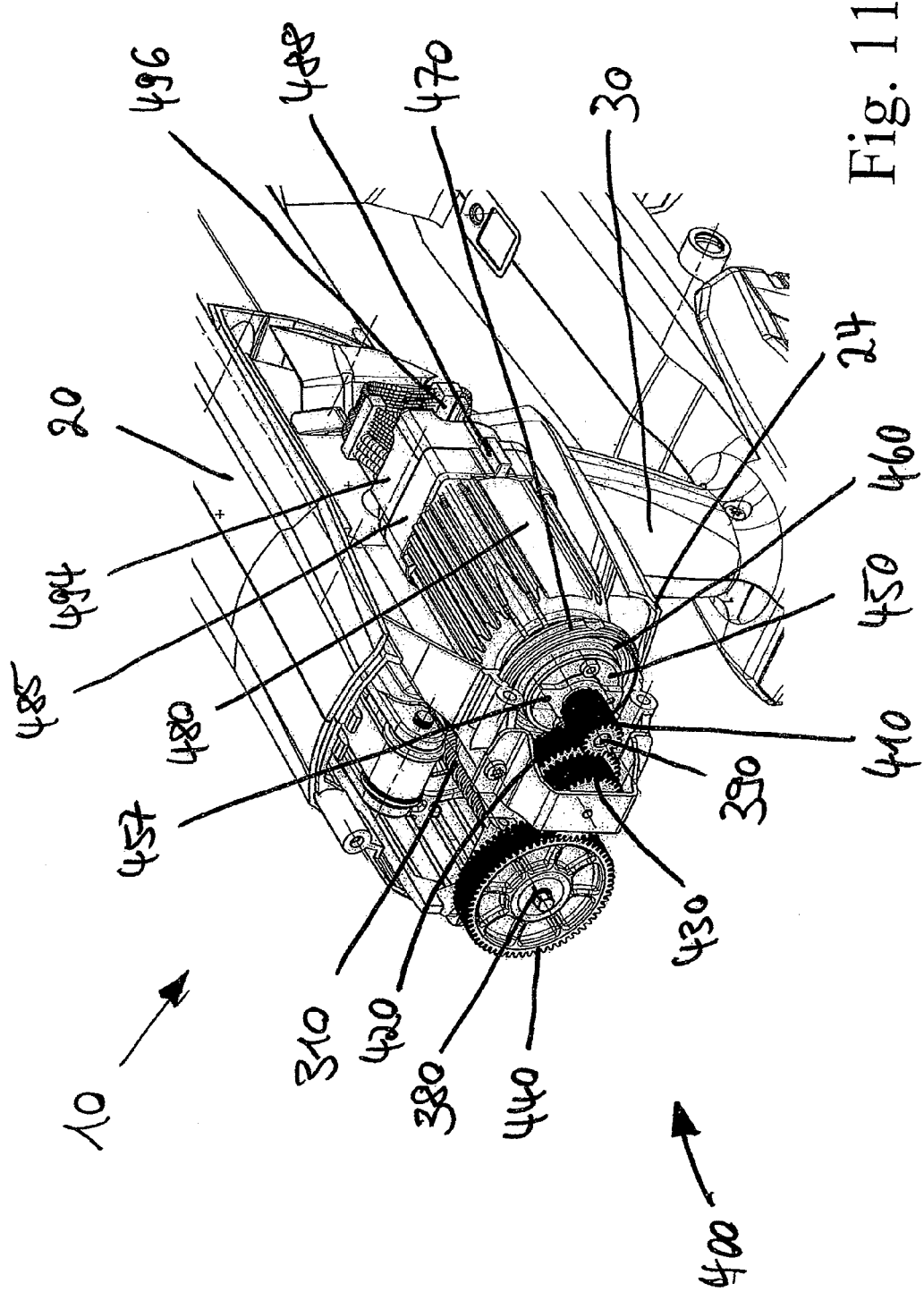
FIG. 11, a partial view of a driving device.

FIG. 11 shows the driving device 10 in another partial view. The housing 20 has the grip 30 and the motor housing 24. In the motor housing 24 shown only partially, the motor 480 is accommodated with the motor retainer 485. The motor pinion 410 with the armature recess 457 and the retaining mechanism 450 sits on the not-shown motor output of the motor 480.

The motor pinion 410 drives gearwheels 420, 430 of a torque-transfer mechanism formed as transmission 400. The transmission 400 transfers a torque of the motor 480 to a spindle gear 440 that is connected locked in rotation with a rotational drive formed as spindle 310 of a movement converter not shown in more detail. The transmission 400 has a step-down gear ratio, so that a greater torque is exerted on the spindle 310 than on the motor output 490.

In order to protect the motor 480 from large accelerations that occur in the driving device 10, especially in the housing 20, during a driving procedure, the motor 480 is decoupled from the housing 20 and the spindle drive. Because a rotational axis 390 of the motor 480 is oriented parallel to a setting axis 380 of the driving device 10, a decoupling of the motor 480 in the direction of the rotational axis 390 is desirable. This is implemented in that the motor pinion 410 and the gearwheel 420 driven directly by the motor pinion 410 are arranged displaceable relative to each other in the direction of the setting axis 380 and the rotational axis 390.

The motor 480 is thus fastened to the housing-fixed assembly element 470 and thus to the housing 20 only by means of the motor damping element 460. The assembly element 470 is held secured against twisting by means of a notch 475 in corresponding counter contours of the housing 20. In addition, the motor is supported displaceable only in the direction of its rotational axis 390, namely by means of the motor pinion 410 on the gearwheel 420 and by means of a guide element 488 of the motor retainer 485 on a correspondingly shaped, not-shown motor guide of the motor housing 24.

Figure 12A:
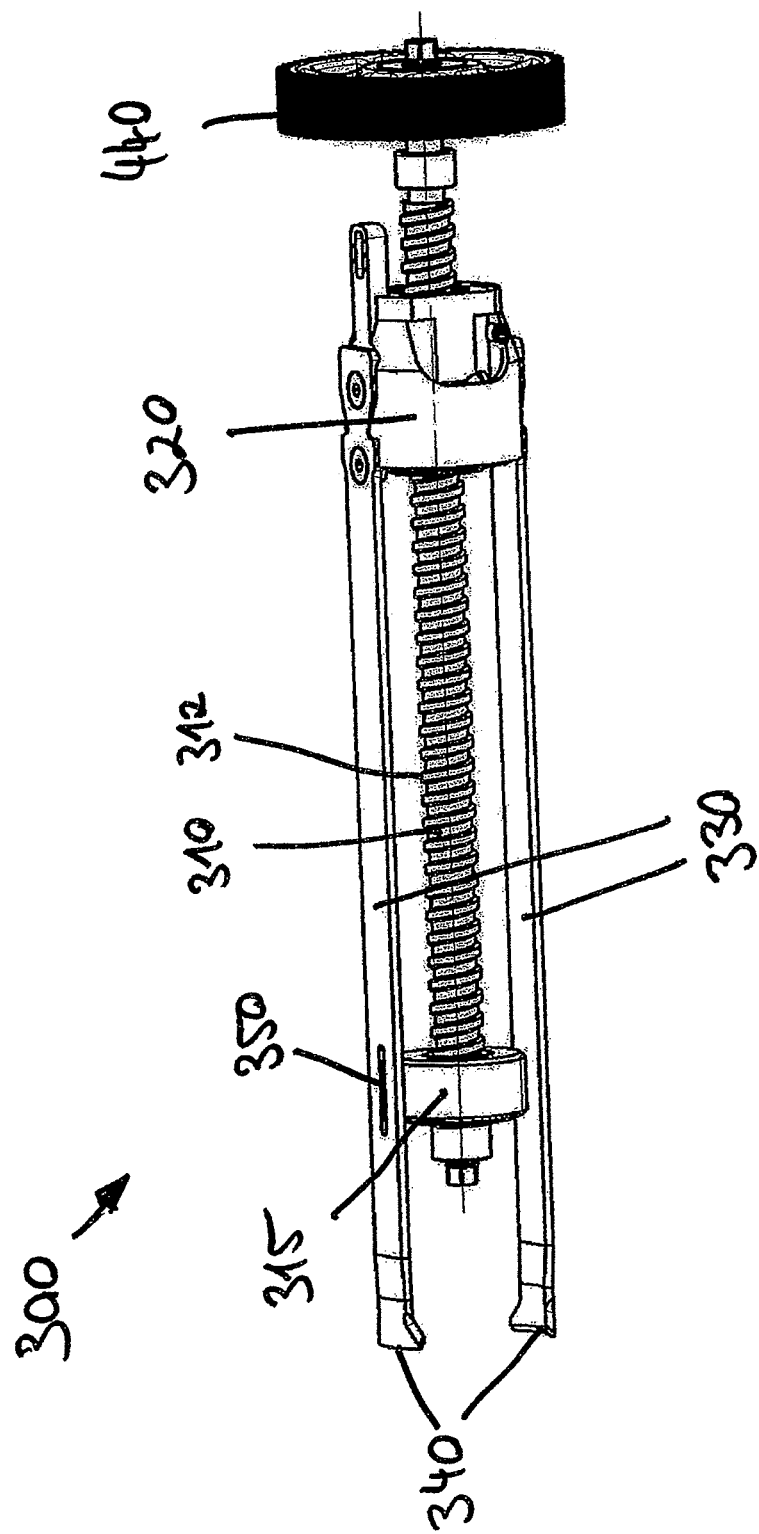
FIG. 12a, a perspective view of a spindle drive.

FIG. 12*a* shows a movement converter formed as a spindle drive 300 in a perspective view. The spindle drive 300 has a rotational drive formed as a spindle 310 and also a linear output formed as a spindle nut 320. A not-shown internal thread of the spindle nut 320 here engages with an external thread 312 of the spindle.

If the spindle 310 is now driven to rotate by means of the spindle gear 440 fastened locked in rotation on the spindle 310, then the spindle nut 320 moves along the spindle 310 in a linear motion. The rotational movement of the spindle 310 is thus converted into a linear movement of the spindle nut 320. In order to prevent rotation of the spindle nut 320 with the spindle 310, the spindle 320 has a twisting securing device in the form of catch elements 330 fastened on the spindle nut 320. For this purpose, the catch elements 330 are guided in not-shown guide slots of a housing or a housing-fixed component of the driving device.

The catch elements 330 are further constructed as retaining rods for retracting a not-shown piston into its starting position and have barbed hooks 340 that engage in corresponding retaining pins of the piston. A slot-shaped magnet receptacle 350 is used for holding a not-shown magnet armature to which a not-shown spindle sensor responds, in order to detect a position of the spindle nut 320 on the spindle 310.

Figure 12B:
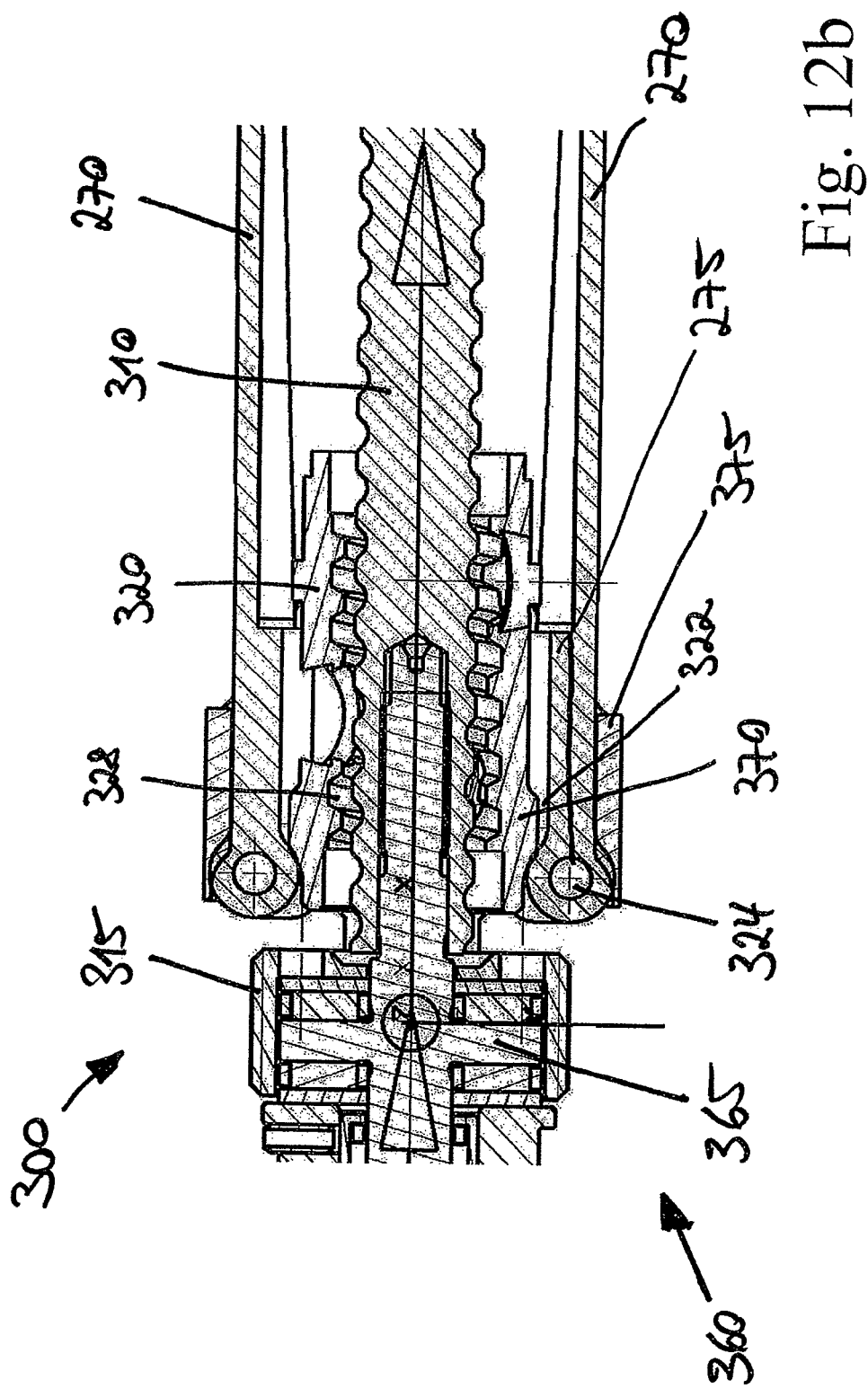
FIG. 12b, a longitudinal section of a spindle drive.

FIG. 12*b* shows the spindle drive 300 with the spindle 310 and the spindle nut 320 in a partial longitudinal section. The spindle nut has an internal thread 328 that engages with the external thread 312 of the spindle.

A force diverter of a force-transfer mechanism formed as belt 270 for transferring a force from the spindle nut 320 to a not-shown mechanical-energy storage device is fastened to the spindle nut 320. For this purpose, the spindle nut 320 has, in addition to an internally threaded sleeve 370, an external clamping sleeve 375, wherein a peripheral gap between the threaded sleeve 370 and the clamping sleeve 375 forms a passage 322. The belt 270 is guided through the passage 322 and fixed on a locking element 324, in that the belt 270 surrounds the locking element 324 and is led back through the passage 322 again, where a belt end 275 is sewn with the belt 270. Advantageously, the locking element has a peripheral form just like the passage 322 as a locking ring.

Perpendicular to the passage 322, that is, in the radial direction with respect to a spindle axis 311, the locking element 324 has, together with the formed belt loop 278, a larger width than the passage 322. Thus, the locking element 324 cannot slip through the passage 322 with the belt loop 278, so that the belt 270 is fastened to the spindle nut 320.

Through the fastening of the belt 270 to the spindle nut 320, it is guaranteed that a tensioning force of the not-shown mechanical-energy storage device that is constructed, in particular, as a spring, is diverted by the belt 270 and transferred directly to the spindle sleeve 320. The tensioning force is transferred from the spindle nut 320 via the spindle 310 and a tie rod 360 to a not-shown coupling mechanism that holds a similarly not-shown, coupled piston. The tie rod has a spindle arbor 365 that is connected rigidly on one side to the spindle 310 and is supported on the other side in a spindle bearing 315 so that it can rotate.

Because the tensioning force is also exerted on the piston, but in the opposite direction, the tensile forces exerted on the tie rod 360 are essentially canceled, so that tension is relieved from a not-shown housing on which the tie rod 360 is supported, in particular, fastened. The belt 270 and the spindle nut 320 are loaded mutually with the tensioning force, while the piston is to be accelerated onto a not-shown fastening element.

Figure 13:
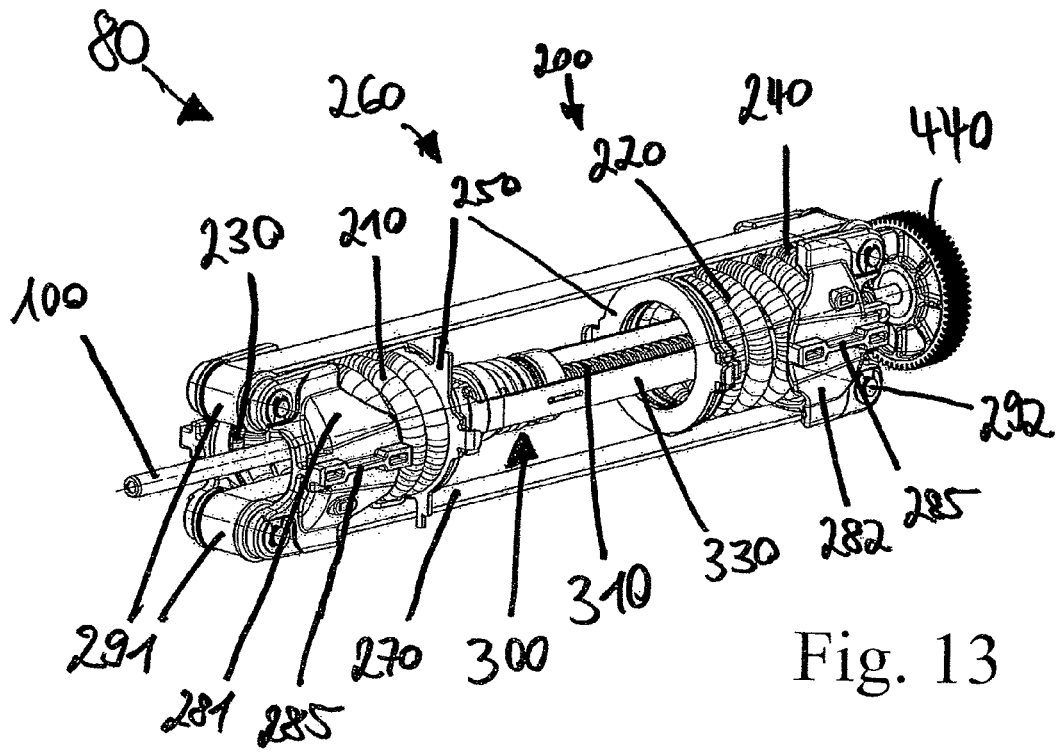
FIG. 13, a perspective view of a tensioning device.

FIG. 13 shows a force-transfer mechanism formed as roll train 260 for transferring a force to a spring 200 in a perspective view. The roll train 260 has a force diverter formed by a belt 270 and also a front roll holder 281 with front rolls 291 and a rear roll holder 282 with rear rolls 292. The roll holders 281, 282 are advantageously made from, in particular, a fiber-reinforced plastic. The roll holders 281, 282 have guide rails 285 for a guide of the roll holders 281, 282 in a not-shown housing of the driving device, in particular, in grooves of the housing.

The belt engages with the spindle nut and also a piston 100 and is placed above the rolls 291, 292, so that the roll train 260 is formed. The piston 100 is coupled in a not-shown coupling mechanism. The roll train causes a step-up transmission of a speed of the spring ends 230, 240 into a speed of the piston 100 by a factor of two.

Furthermore, a spring 200 is shown that comprises a front spring element 210 and a rear spring element 220. The front spring end 230 of the front spring element 210 is held in the front roll holder 281, while the rear spring end 240 of the rear spring element 220 is held in the rear roll holder. The spring elements 210, 220 are supported on support rings 250 on their facing sides. Through the symmetric arrangement of the spring elements 210, 220, recoil forces of the spring elements 210, 220 are canceled out, so that the operating comfort of the driving device is improved.

Furthermore, a spindle drive 300 is shown with a spindle gear 440, a spindle 310, and a spindle nut arranged within the rear spring element 220, wherein a catch element 330 fastened to the spindle nut is to be seen.

Figure 14:
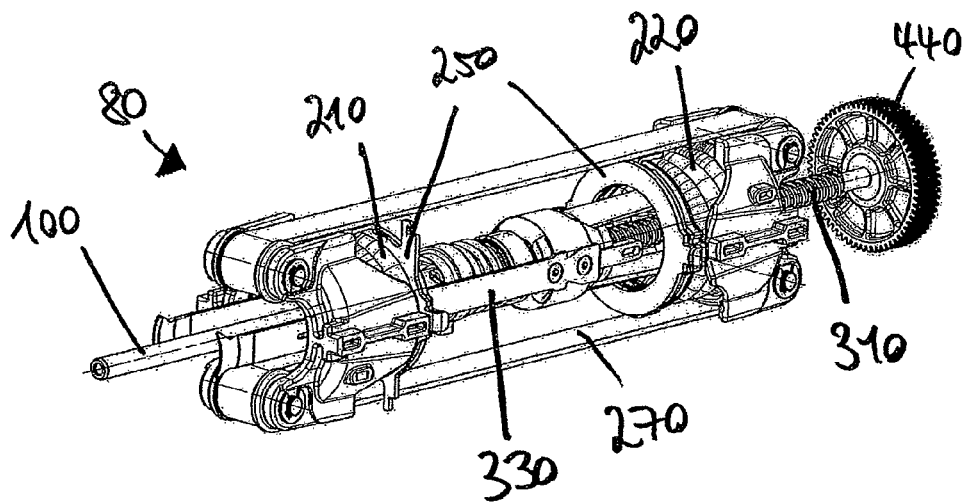
FIG. 14, a perspective view of a tensioning device.

FIG. 14 shows the roll train 260 in a tensioned state of the spring 200. The spindle nut 320 is now located on the coupling-side end of the spindle 310 and pulls the belt 270 into the rear spring element. Therefore, the roll holders 281, 282 are moved toward each other, and the spring elements 210, 220 are tensioned. The piston 100 is here held by the coupling mechanism 150 against the spring force of the spring elements 210, 220.

Figure 15:
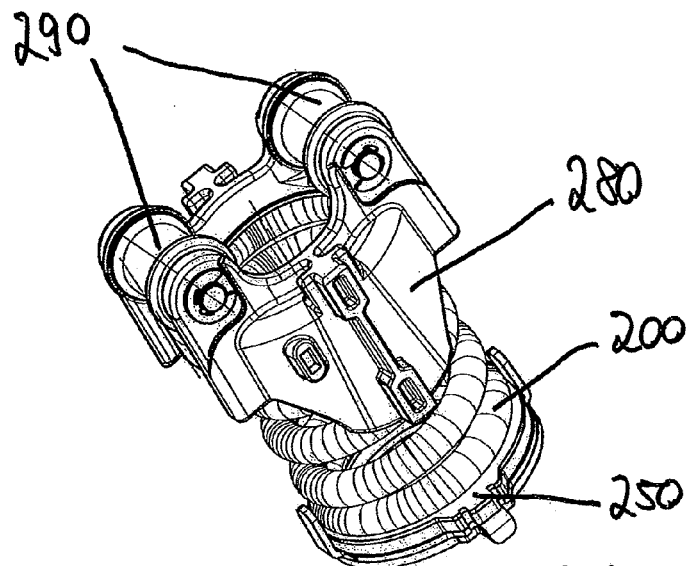
FIG. 15, a perspective view of a roller holder.

FIG. 15 shows a spring 200 in a perspective view. The spring 200 is constructed as a coil spring and is made from steel. One end of the spring 200 is held in a roll holder 280; the other end of the spring 200 is fastened to a support ring 250.

The roll holder 280 has rolls 290 that project from the roll holder 280 on the side of the roll holder 280 facing away from the spring 200. The rolls are supported so that they can rotate about axes that are parallel to each other and allow a not-shown belt to be pulled into the interior of the spring 200.

Figure 16:
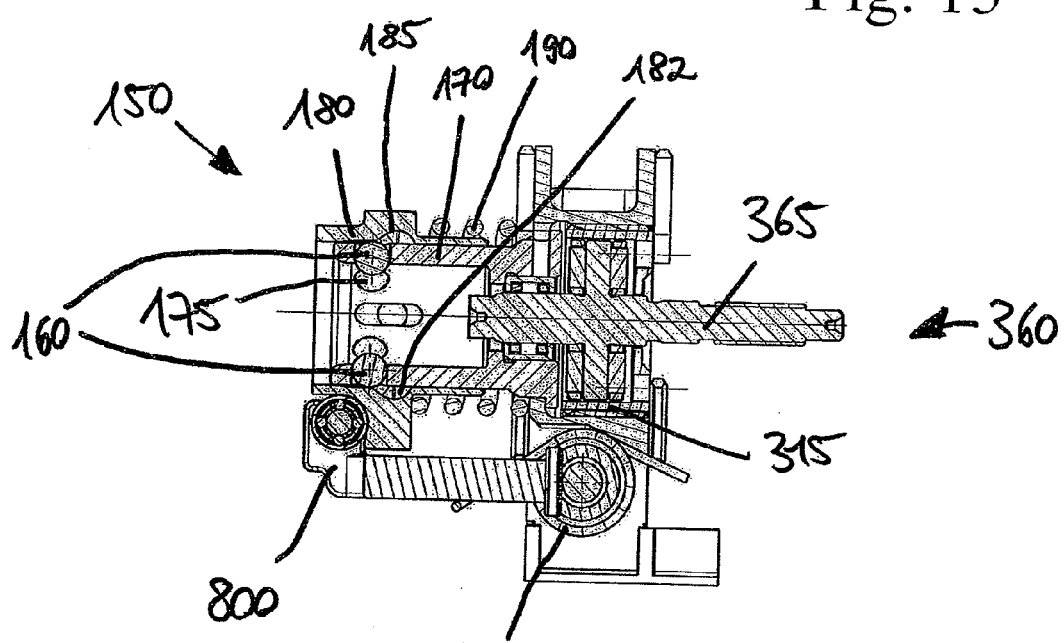
FIG. 16, a longitudinal section of a coupling.

FIG. 16 shows a coupling mechanism 150 for a temporary fixing of an energy-transfer element, in particular, a piston, in a longitudinal section. Furthermore, the tie rod 360 is shown with the spindle bearing 315 and the spindle arbor 365.

The coupling mechanism 150 has an inner sleeve 170 and an outer sleeve 180 displaceable relative to the inner sleeve 170. The inner sleeve 170 is provided with recesses 175 constructed as openings, wherein locking elements constructed as balls 160 are arranged in the recesses 175. In order to prevent the balls 160 from falling out into an interior of the inner sleeve 170, the recesses 175 taper inward, in particular, in a conical shape, to a cross section through which the balls 160 cannot pass. In order to be able to lock the coupling mechanism 150 with the help of the balls 160, the outer sleeve 180 has a support surface 185 on which the balls 160 are supported on the outside in a locked state of the coupling mechanism 150, as shown in FIG. 16.

In the locked state, the balls 160 therefore project into the interior of the inner sleeve and hold the piston in the coupling. A retaining element constructed as pawl 800 here holds the outer sleeve in the illustrated position against the spring force of a restoring spring 190. The pawl is here biased by a pawl spring 810 against the outer sleeve 180 and engages behind a coupling pin projecting from the outer sleeve 180.

For releasing the coupling mechanism 150, for example, by the actuation of a trigger, the pawl 800 is moved away from the outer sleeve 180 against the spring force of the pawl spring 810, so that the outer sleeve 180 is moved toward the left in the drawing by the restoring spring 190. On its inside, the outer sleeve 180 has recesses 182 that can then hold the balls 160 sliding along the inclined support surfaces into the recesses 182 and releasing the interior of the inner sleeve.

Figure 17:
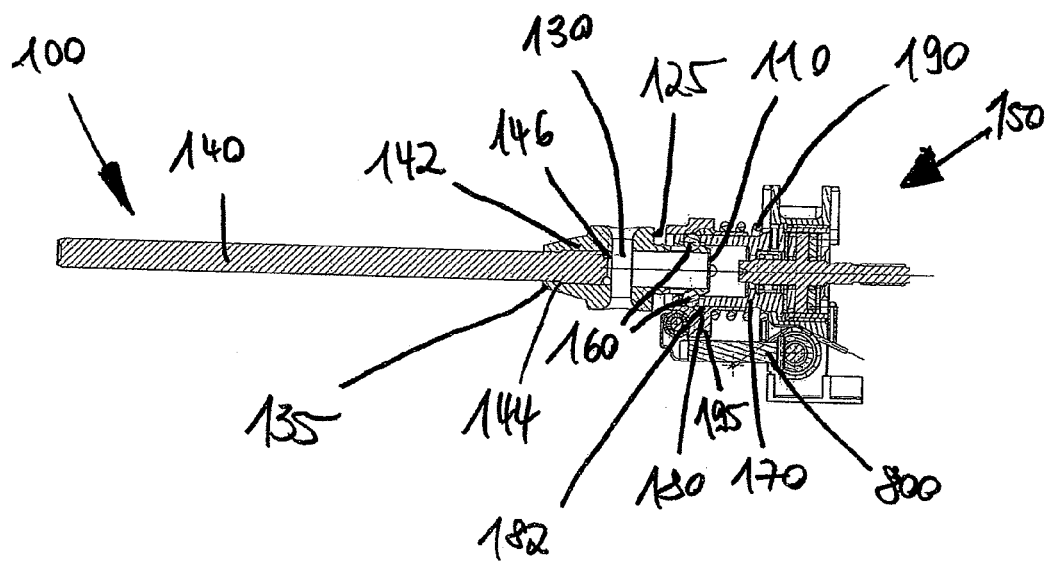
FIG. 17, a longitudinal section of a coupled piston.

FIG. 17 shows another longitudinal section of the coupling mechanism 150 with coupled piston 100. For this purpose, the piston has a coupling plug-in part 110 with coupling recesses 120 in which the balls 160 of the coupling mechanism 150 can engage. Furthermore, the piston 100 has a shoulder 125 and also a belt passage 130 and a convexo-conical section 135. The balls 160 are advantageously made from hardened steel.

A coupling of the piston 100 in the coupling mechanism 150 begins in an unlocked state of the coupling mechanism 150 in which the outer sleeve 180 loaded by the restoring spring 190 allows a holding of the balls 160 in the recesses 182. The piston 100 can therefore displace the balls 160 outward when the piston 100 is inserted into the inner sleeve 170. With the help of the shoulder 125, the piston 100 then pushes the outer sleeve 180 against the force of the restoring spring 190. As soon as the pawl 800 engages with the coupling pin 195, the coupling mechanism 150 is held in the locked state.

The piston 100 comprises a shaft 140 and a head 142, wherein the shaft 140 and the head 142 are advantageously soldered to each other. A positive fit in the form of a shoulder 144 prevents the shaft 140 from sliding out from the head 142 in the case of rupture of the solder connection 146.

Figure 18:
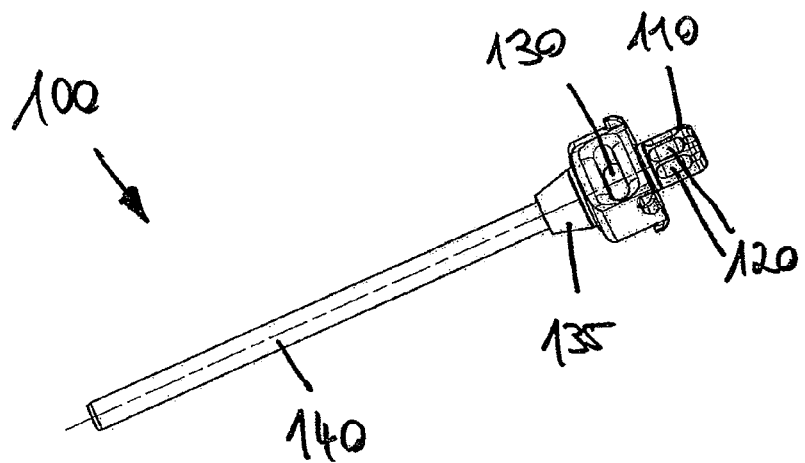
FIG. 18, a perspective view of a piston.

FIG. 18 shows an energy-transfer mechanism constructed as piston 100 in a perspective view. The piston has a shaft 140, a convexo-conical section 135, and a recess constructed as belt passage 130. The belt passage 130 is constructed as an elongated hole and has, for gentle treatment of the belt, only rounded edges and heat-treated surfaces. A coupling plug-in part 110 with coupling recesses 120 connects to the belt passage.

Figure 19:
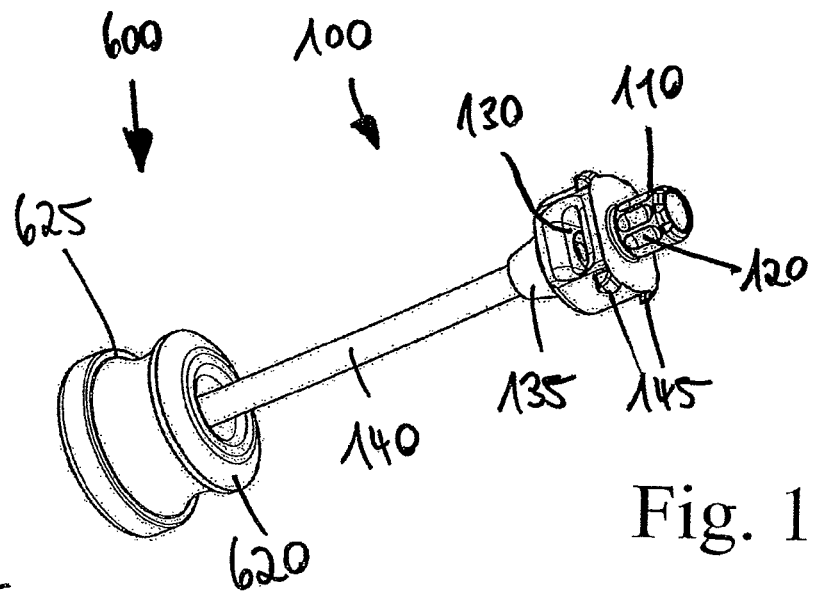
FIG. 19, a perspective view of a piston with a deceleration element.

FIG. 19 shows the piston 100 together with a deceleration element 600 in a perspective view. The piston has a shaft 140, a convexo-conical section 135, and a recess constructed as belt passage 130. A coupling plug-in part 110 with coupling recesses 120 connects to the belt passage. Furthermore, the piston 100 has several retaining pins 145 for engaging not-shown catch elements, for example, belonging to a spindle nut.

The deceleration element 600 has a stop surface 620 for the convexo-conical section 135 of the piston 100 and is held in a not-shown receptacle element. The deceleration element 600 is held in the receptacle element by a not-shown retaining ring, wherein the retaining ring contacts a retaining shoulder 625 of the deceleration element 600.

Figure 20:
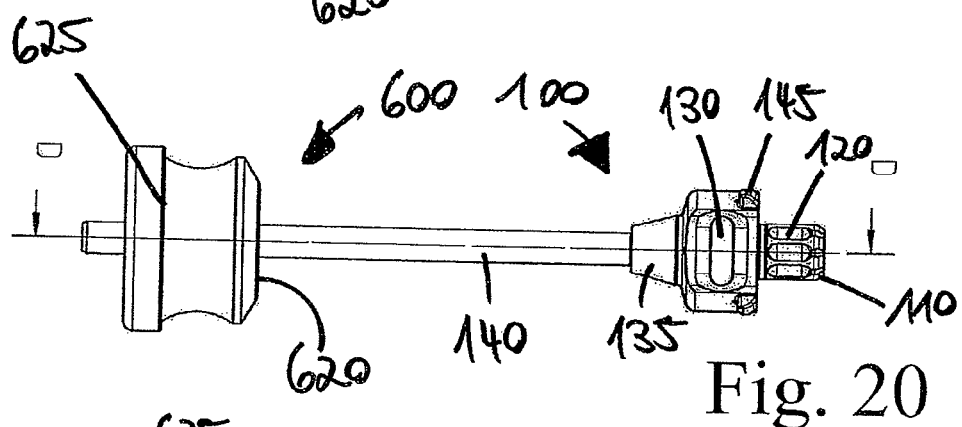
FIG. 20, a side view of a piston with a deceleration element.

FIG. 20 shows the piston 100 together with the deceleration element 600 in a side view. The piston has a shaft 140, a convexo-conical section 135 and a belt passage 130. A coupling plug-in part 110 with coupling recesses 120 connects to the belt passage. The deceleration element 600 has a stop surface 620 for the convexo-conical section 135 of the piston 100 and is held in the not-shown receptacle element.

Figure 21:
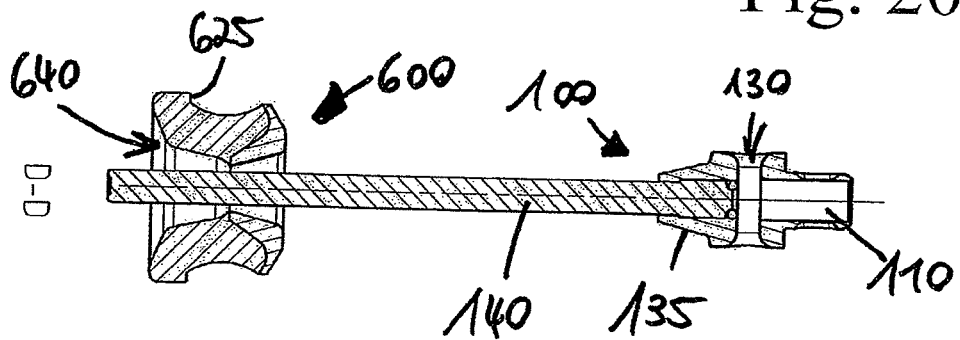
FIG. 21, a longitudinal section of piston with a deceleration element.

FIG. 21 shows the piston 100 together with the deceleration element 600 in a longitudinal section. The stop surface 620 of the deceleration element 600 is adapted to the geometry of the piston 100 and therefore likewise has a convexo-conical section. In this way, a planar contact of the piston 100 against the deceleration element 600 is guaranteed. Thus, excess energy of the piston 100 is absorbed sufficiently by the deceleration element. Furthermore, the deceleration element 600 has a piston passage 640 through which the shaft 140 of the piston 100 extends.

FIG. 22 shows the deceleration element 600 in a side view. The deceleration element 600 has a stop element 610 and also an impact-damping element 630 that connect to each other along a setting axis S of the driving device. Excess impact energy of a not-shown piston is initially received by the stop element 610 and then damped by the impact-damping element 630, that is, expanded in time. The impact energy is finally received by the not-shown receptacle element that has a floor as a first support wall for supporting the deceleration element 600 in the impact direction and a side wall as a second support wall for supporting the deceleration element 600 perpendicular to the impact direction.

FIG. 23 shows the deceleration element 600 with the holder 650 in a longitudinal section. The deceleration element 600 has a stop element 610 and also an impact-damping element 630 that connect to each other along a setting axis S of the driving device. The stop element 610 is made from steel; in contrast, the impact-damping element 630 is made from an elastomer. A mass of the impact-damping element 630 advantageously equals between 40% and 60% of a mass of the stop element.

FIG. 24 shows the driving device 10 in a perspective view with opened housing 20. In the housing, the front roll holder 281 is to be seen. The deceleration element 600 is held in its position by the retaining ring 26. The tab 690 has, among other things, the contact-pressing sensor 760 and the unlocking element 720. The contact-pressing mechanism 750 has the guide channel 700 that advantageously comprises the contact-pressing sensor 760 and the connecting rod 770. The magazine 40 has the advancing element 740 and the advancing spring 735.

Furthermore, the driving device 10 has an unlocking switch 730 for an unlocking of the guide channel 700, so that the guide channel 700 can be removed, for example, in order to be able to more easily remove clamped fastening elements.

Figure 25:
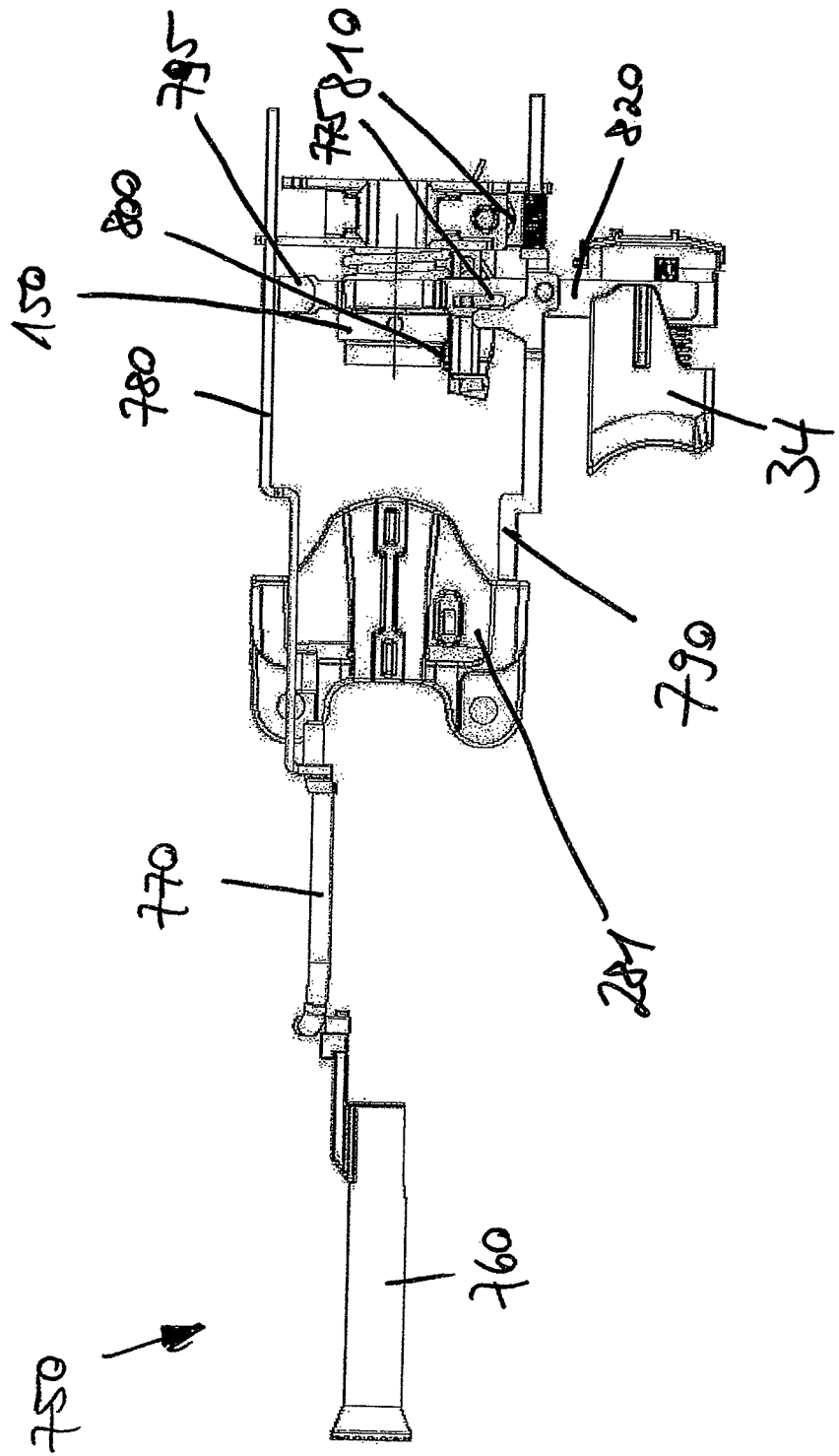
FIG. 25, a side view of a contact-pressing mechanism.

FIG. 25 shows a contact-pressing mechanism 750 in a side view. The contact-pressing mechanism comprises a contact-pressing sensor 760, an upper push rod 780, a connecting rod 770 for connecting the upper push rod 780 to the contact-pressing sensor 760, a lower push rod 790 connected to a front roll holder 281 and a crossbar 795 linked to the upper push rod 780 and to the lower push rod. A trigger rod 820 is connected at one end to a trigger 34. The crossbar 795 has an elongated hole 775. Furthermore, a coupling mechanism 150 is shown that is held in a locked position by a pawl 800.

FIG. 26 shows a partial view of the contact-pressing mechanism 750. Shown are the upper push rod 780, the lower push rod 790, the crossbar 795 and the trigger rod 820. The trigger rod 820 has a trigger diverter 825 projecting laterally from the trigger rod. Furthermore, a pin element 830 that has a trigger pin 840 and is guided in a pawl guide 850 is shown. The trigger pin 840 is guided, on its side, in the elongated hole 775. Furthermore, it becomes clear that the lower push rod 790 has a pin block 860.

FIG. 27 shows another partial view of the contact-pressing mechanism 750. Shown are the crossbar 795, the trigger rod 820 with the trigger diverter 825, the pin element 830, the trigger pin 840, the pawl guide 850 and also the pawl 800.

FIG. 28 shows the trigger 34 and the trigger rod 820 in a perspective view, but from the other side of the device than the preceding figures. The trigger has a trigger actuator 870, a trigger spring 880 and also a trigger rod spring 828 that applies a load on the trigger diverter 825. Furthermore, it becomes clear that the trigger rod 820 is provided laterally with a pin notch 822 that is arranged at the height of the trigger pin 840.

In order to allow a user of the driving device to initiate a driving procedure by pulling the trigger 34, the trigger pin 840 must engage with the pin notch 822. Only then does a downward movement of the trigger rod 820 cause an engagement of the trigger pin 840 and thus, by means of the pawl guide 850, a downward movement of the pawl 800, wherein the coupling mechanism 150 is unlocked and the driving procedure is initiated. Pulling of the trigger 34 causes, in each case, by means of the beveled trigger diverter 825, a downward movement of the trigger rod 820.

A prerequisite for the trigger rod 840 engaging with the pin notch 822 is that the elongated hole 775 in the crossbar 795 is located in its rearmost position, that is, at the right in the drawing. In the position shown, for example, in FIG. 26, the elongated hole 775 and thus also the trigger pin 840 is located too far forward, so that the trigger pin 840 does not engage with the pin notch 822. Pulling the trigger 34 thus does nothing. The reason for this is that the upper push rod 780 is located in its front position and thus indicates that the driving device is not pressed onto a substrate.

A similar situation is produced when a not-shown spring is not tensioned. Then, the front roll holder 281 and thus also the lower push rod 790 are each located in their forward position, so that the elongated hole 775 again moves the trigger pin 840 out of engagement with the pin notch 822. As a result, pulling the trigger 34 also does nothing when the spring is not tensioned.

A different situation is shown in FIG. 25. There, the driving device is both in a state that can be driven, namely with tensioned spring, and also pressed onto a substrate. Consequently, the upper push rod 780 and the lower push rod 790 are each located in their rearmost position. The elongated hole 775 of the crossbar 795 and thus also the trigger pin 740 are then each located likewise in their rearmost position, in the right in the drawing. Consequently, the trigger pin 740 engages in the pin notch 722, and pulling the trigger 34 causes the trigger pin 740 to be carried along downward by the pin notch 722 by means of the trigger rod 820. By means of the pin element 830 and the pawl guide 850, the pawl 800 is likewise diverted downward against the spring force of the pawl spring 810, so that the coupling mechanism 150 is moved into its unlocked position and an unlocked piston in the coupling mechanism 150 transfers the tensioning energy of the spring to a fastening element.

In order to counteract the risk that the pawl 800 is diverted by vibrations, for example, when a user roughly sets the driving device in the tensioned state of the spring, the lower push rod 790 is provided with the pin lock 860. The driving device is then in the state shown in FIG. 26. Therefore, because the pin lock 860 prevents the pin 840 and thus the pawl 800 from downward movement, the driving device is protected from such inadvertent triggering of a driving procedure.

Figure 29:
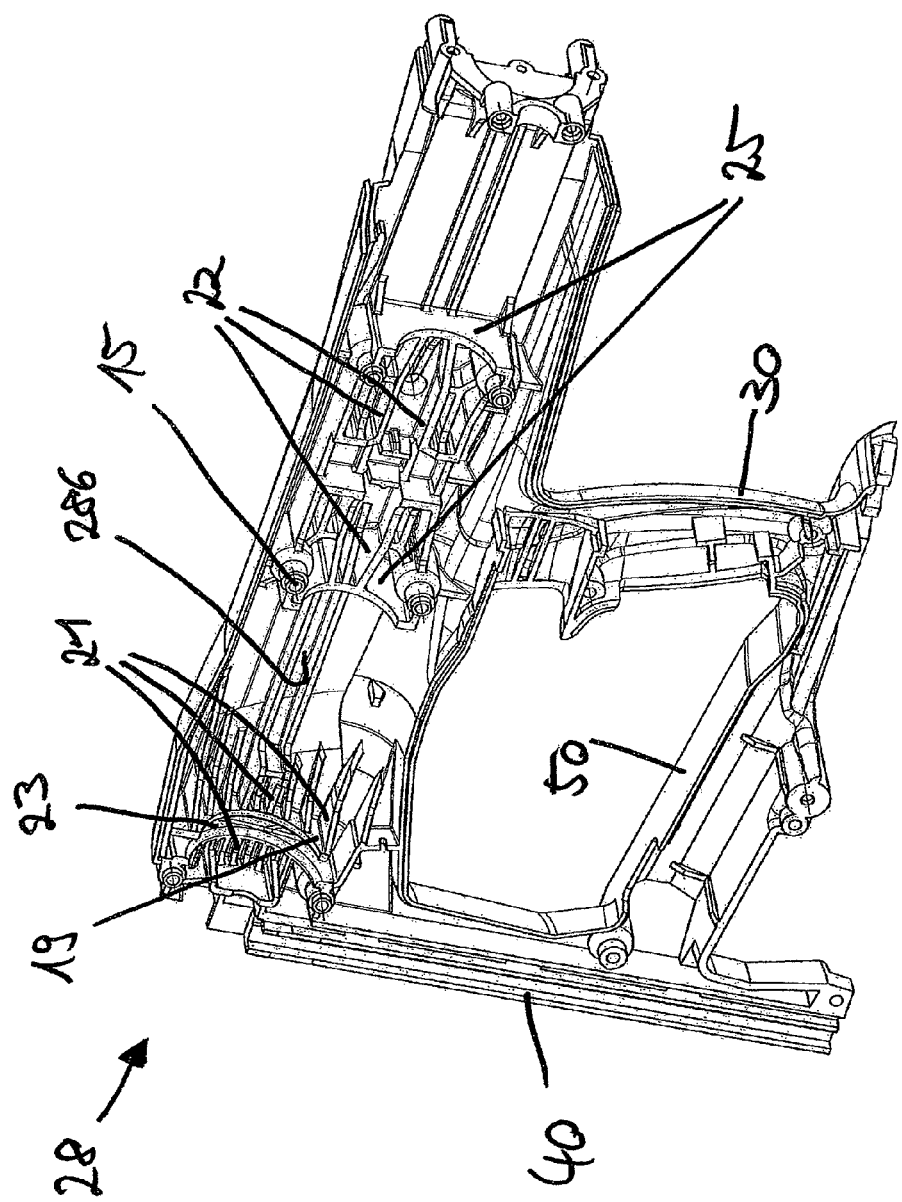
FIG. 29, a partial view of a driving device.

FIG. 29 shows the second housing shell 28 of the housing that is otherwise not shown in detail. The second housing shell 28 consists of, in particular, a fiber-reinforced plastic and has parts of the grip 30, the magazine 40 and the bridge 50 connecting the grip 30 to the magazine 40. Furthermore, the second housing shell 28 has support elements 15 for a support relative to the not-shown first housing shell. Furthermore, the second housing shell 28 has a guide groove 286 for guiding not-shown roll holders.

For holding a not-shown deceleration element for decelerating an energy-transfer element or a holder carrying the deceleration element, the second housing shell 28 has a support flange 23 and also a retaining flange 19, wherein the deceleration element or the holder is held in a gap 18 between the support flange 23 and the retaining flange 19. The deceleration element or the holder is then supported, in particular, on the support flange. In order to introduce impact forces that occur due to impacts of the piston on the deceleration element with reduced stress spikes into the housing, the second housing shell 28 has first reinforcement ribs 21 that are connected to the support flange 23 and/or to the retaining flange 19.

For fastening a drive mechanism that is held in the housing for transporting the energy-transfer element from the starting position into the setting position and back, the second housing shell 28 has two support elements formed as flanges 25. In order to transfer and/or introduce tensile forces that occur, in particular, between the two flanges 25 into the housing, the second housing shell 28 has second reinforcement ribs 22 that are connected to the flanges 25.

The holder is fastened to the drive mechanism only by means of the housing, so that impact forces that are not completely absorbed by the deceleration element are transferred to the drive mechanism only by means of the housing.

Figure 30:
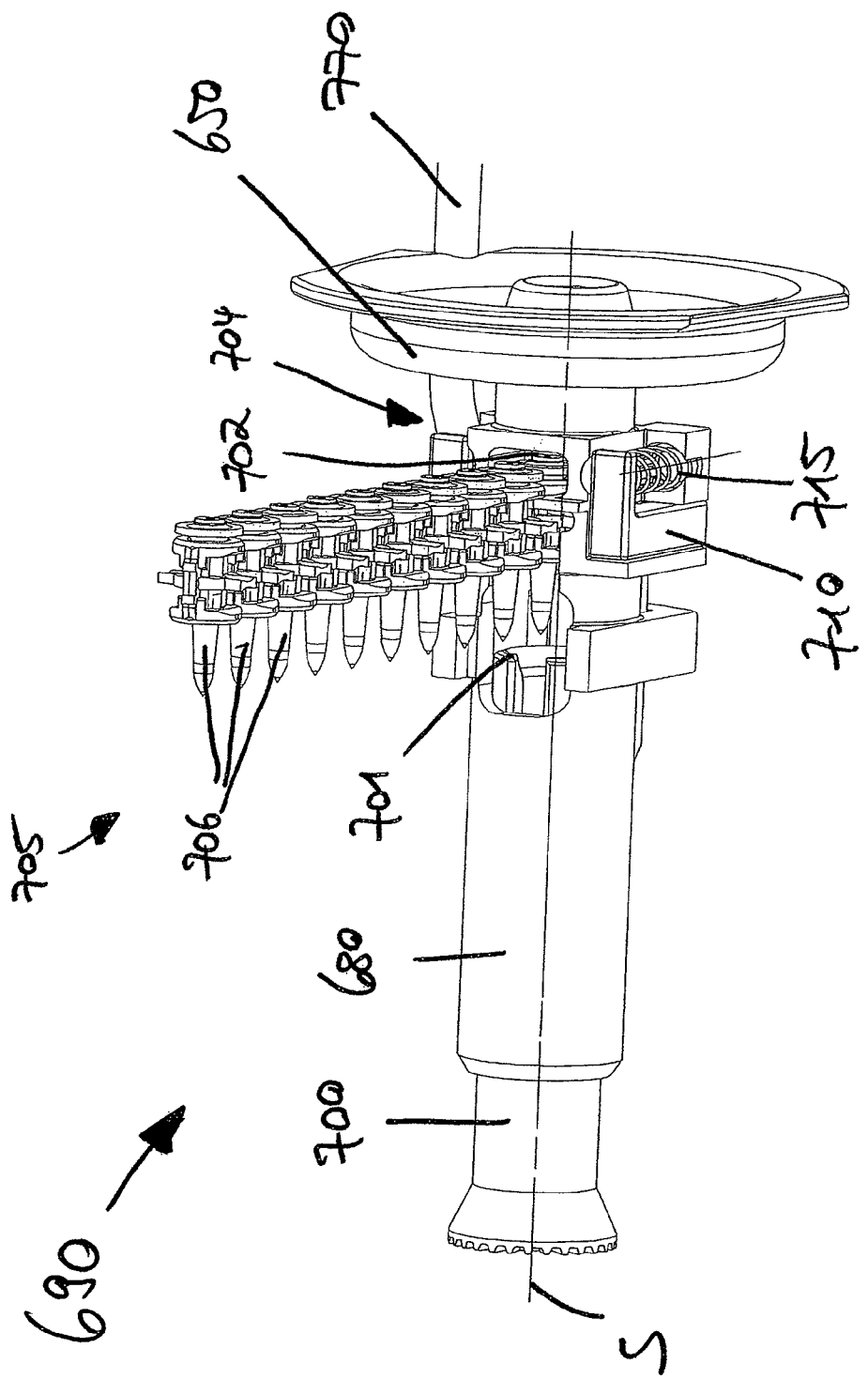
FIG. 30, a perspective view of a bolt guide.

FIG. 30 shows a tab 690 of a device for driving a fastening element into a substrate in a perspective view. The tab 690 comprises a guide channel 700 for guiding the fastening element with a rear end 701 and a holder 650 arranged displaceable relative to the guide channel 700 in the direction of the setting axis for holding a not-shown deceleration element. The holder 650 has a bolt receptacle 680 with a feed recess 704 through which a nail strip 705 with a plurality of fastening elements 706 can be fed to a launching section 702 of the guide channel 700. The guide channel 700 is simultaneously used as a contact-pressing sensor of a contact-pressing mechanism that has a connecting rod 770 that is similarly displaced when the guide channel 700 is displaced and thus indicates a contact pressing of the device onto a substrate.

Figure 31:
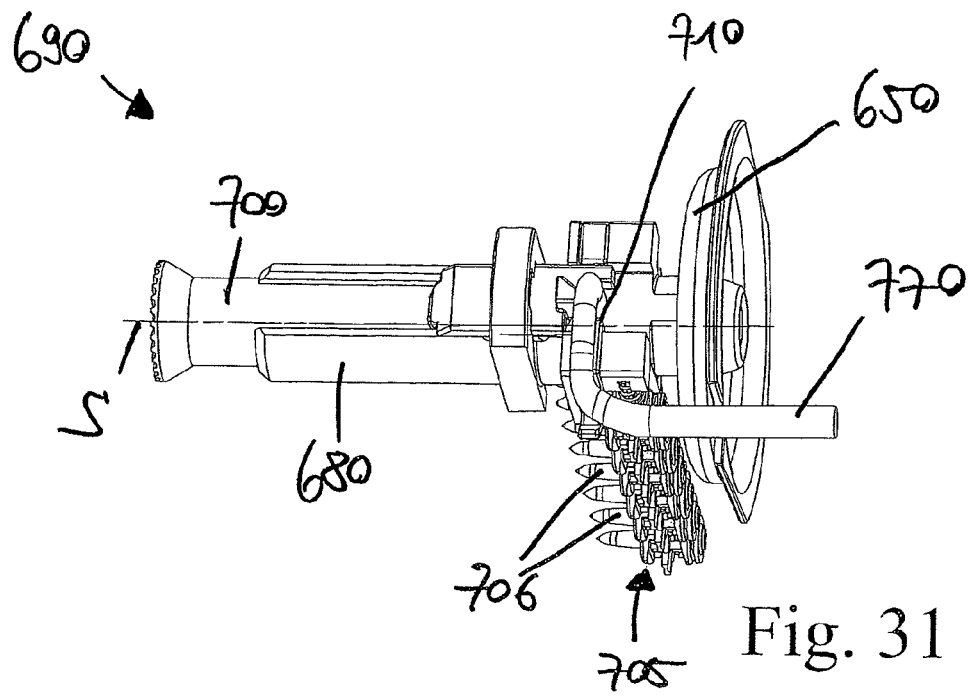
FIG. 31, a perspective view of a bolt guide.

FIG. 31 shows the tab 690 in another perspective view. The guide channel 700 is part of a contact-pressing mechanism for identifying the distance of the driving device to the substrate in the direction of a setting axis S. The tab 690 further has a locking element 710 that allows displacement of the guide channel 700 in a released position and prevents displacement of the guide channel 700 in a locked position. The locking element 710 is to be loaded by an engaging spring hidden in the drawing in a direction toward the nail strip 705. As long as no fastening element is arranged in the launching section 702 in the guide channel 700, the locking element 710 is located in the locked position in which it blocks the guide channel 700, as shown in FIG. 31.

Figure 32:
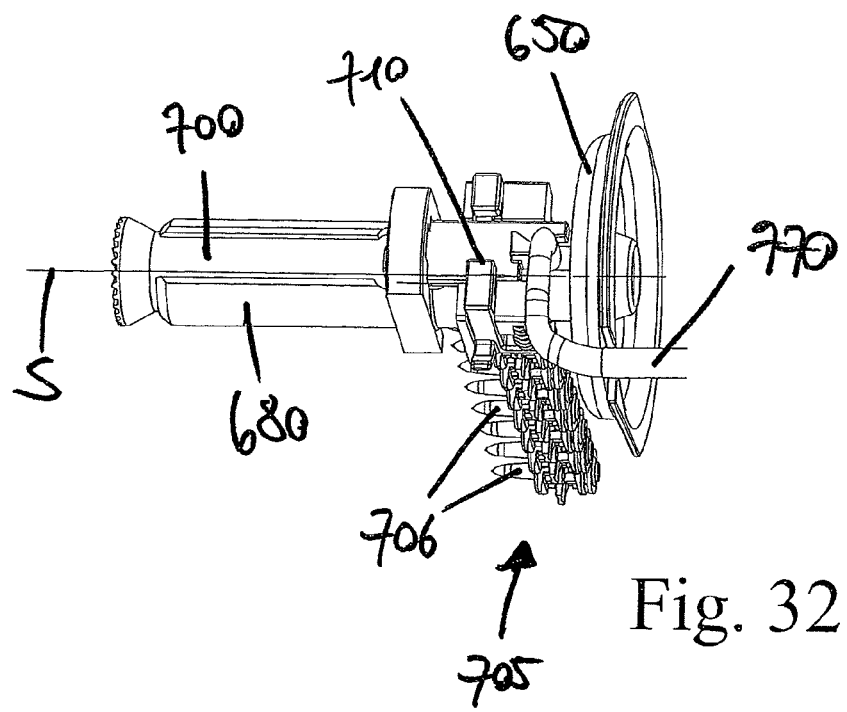
FIG. 32, a perspective view of a bolt guide.

FIG. 32 shows the tab 690 in another perspective view. As soon as a fastening element is arranged in the launching section 702 in the guide channel 700, the locking element 710 is located in a released position in which it can pass the guide channel 700, as shown in FIG. 32. Therefore, the driving device can be pressed onto the substrate. In this case, the connecting rod 770 is displaced, so that the contact pressing can guarantee the triggering of the driving procedure.

Figure 33:
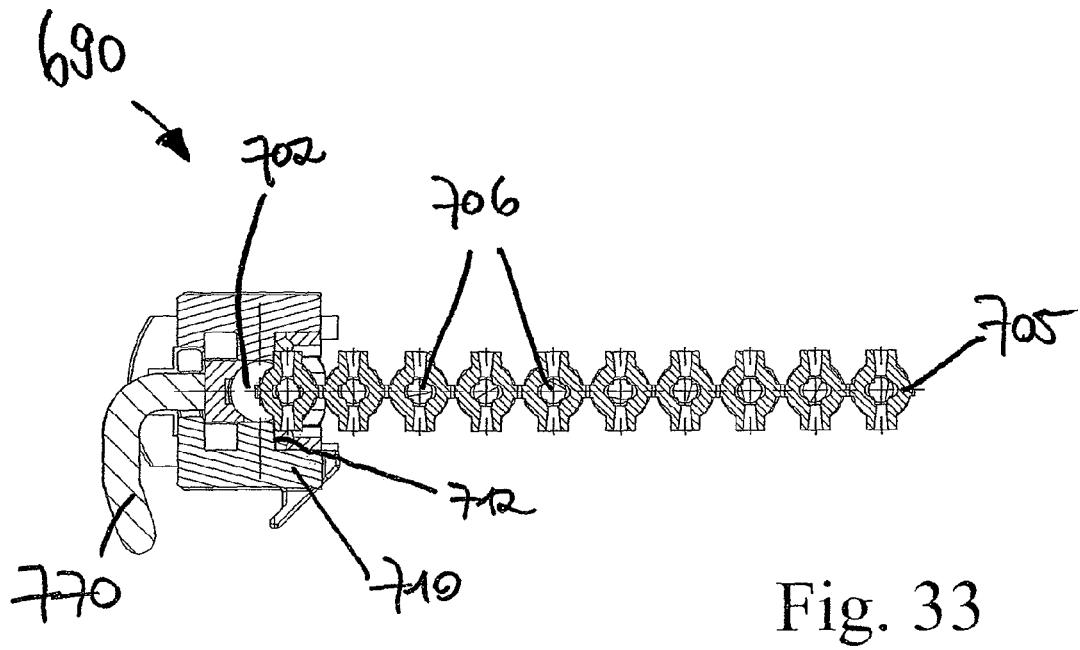
FIG. 33, a cross section of a bolt guide.

FIG. 33 shows the tab 690 in a cross section. The guide channel 700 has a launching section 702. The locking element 710 has, adjacent to the launching section, a locking shoulder 712 that can be loaded by the nail strip 705 or also individual nails.

Figure 34:
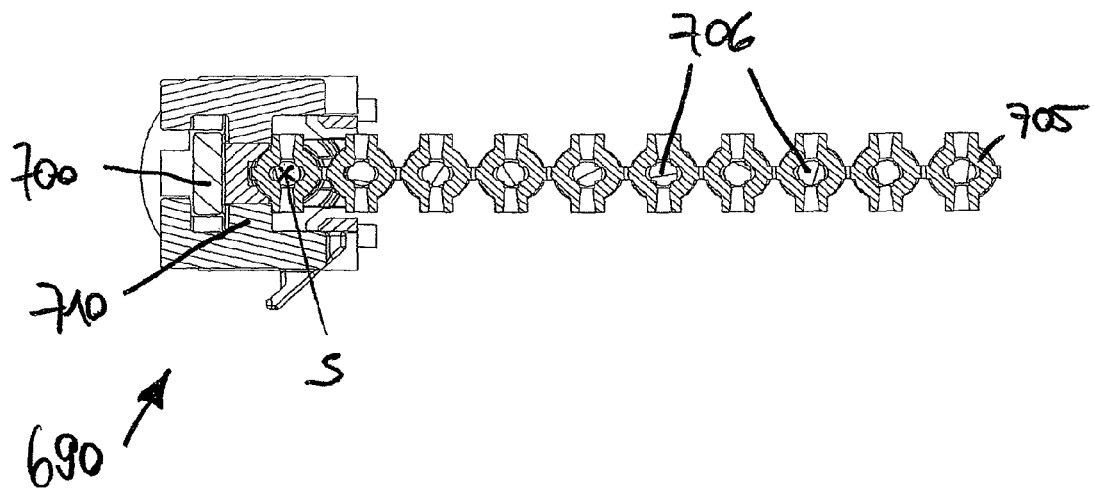
FIG. 34, a cross section of a bolt guide.

FIG. 34 shows the tab 690 in another cross section. The locking element 710 is located in the released position, so that the locking element 710 can pass the guide channel 700 when moving in the direction of the setting axis S.

Figure 35:
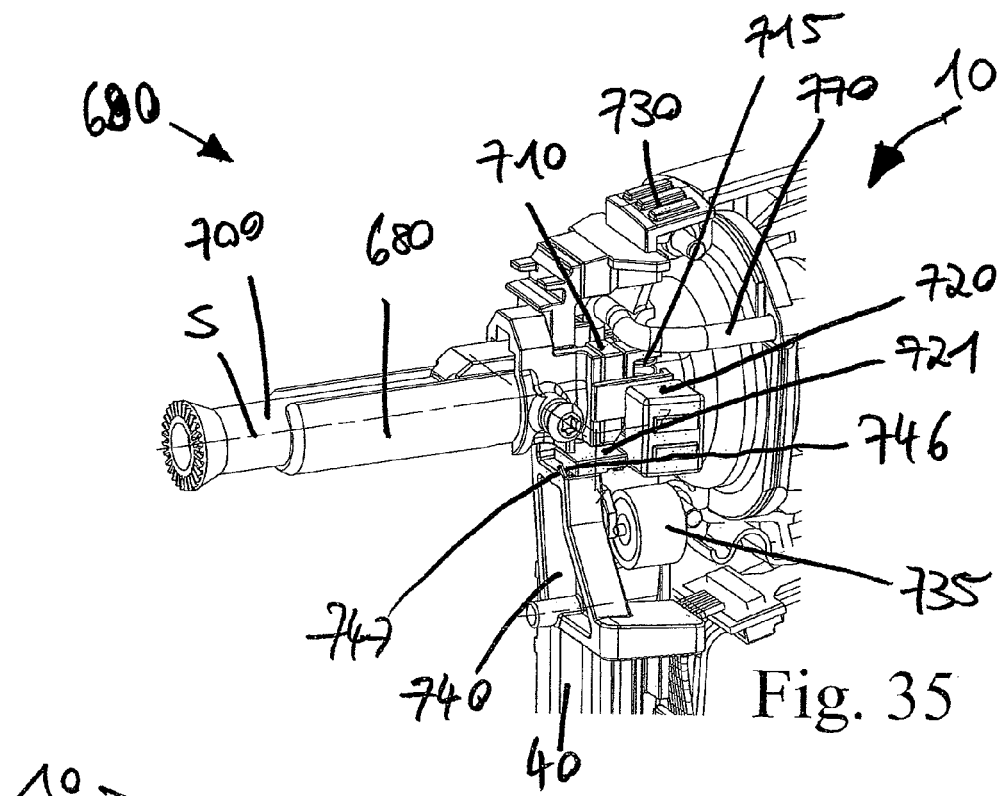
FIG. 35, a partial view of a driving device.

FIG. 35 shows a driving device 10 with the tab 690 in a partial view. The tab 690 has, in addition, an unlocking element 720 that can be actuated by a user and holds, in an unlocked position, the locking element 710 in its released position and allows, in a waiting position, a movement of the locking element in its locked position. On the side of the unlocking element 720 facing away from the viewer, a not-shown disengaging spring is located that loads the unlocking element 720 away from the locking element 710. Furthermore, the unlocking switch 730 is shown.

Figure 36:
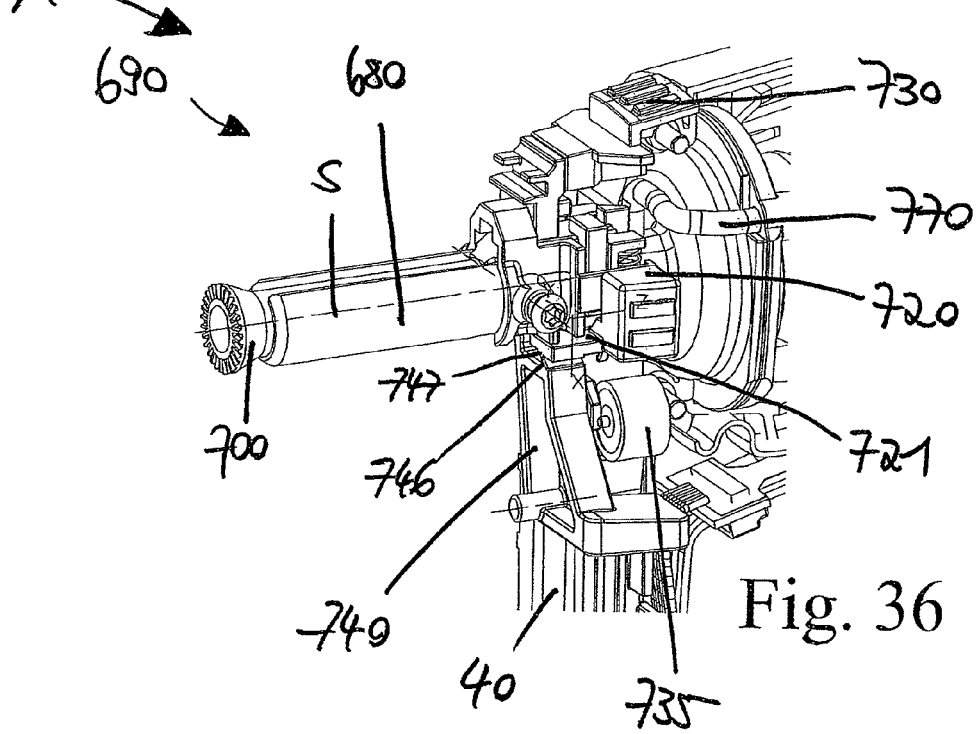
FIG. 36, a partial view of a driving device.

FIG. 36 shows the driving device 10 with the tab 690 in another partial view. A feed mechanism constructed as magazine 40 for fastening elements has, at the launching section, an advancing spring 735 and also an advancing element 740. The advancing spring 735 loads the advancing element 740 and thus also optionally fastening elements located in the magazine toward the guide channel 700. The unlocking element 720 has, at a projection 721 of the unlocking element 720, a first catch element 746, and the advancing element 740 has a second catch element 747. The first and the second catch element lock with each other when the unlocking element 720 is moved into the unlocked position. In this state, individual fastening elements could be introduced along the setting axis S into the guide channel 700. As soon as the magazine 40 has been reloaded, the engagement between the unlocking element 720 and the advancing element 740 is detached, and the driving device can be used again as usual.

Figure 37:
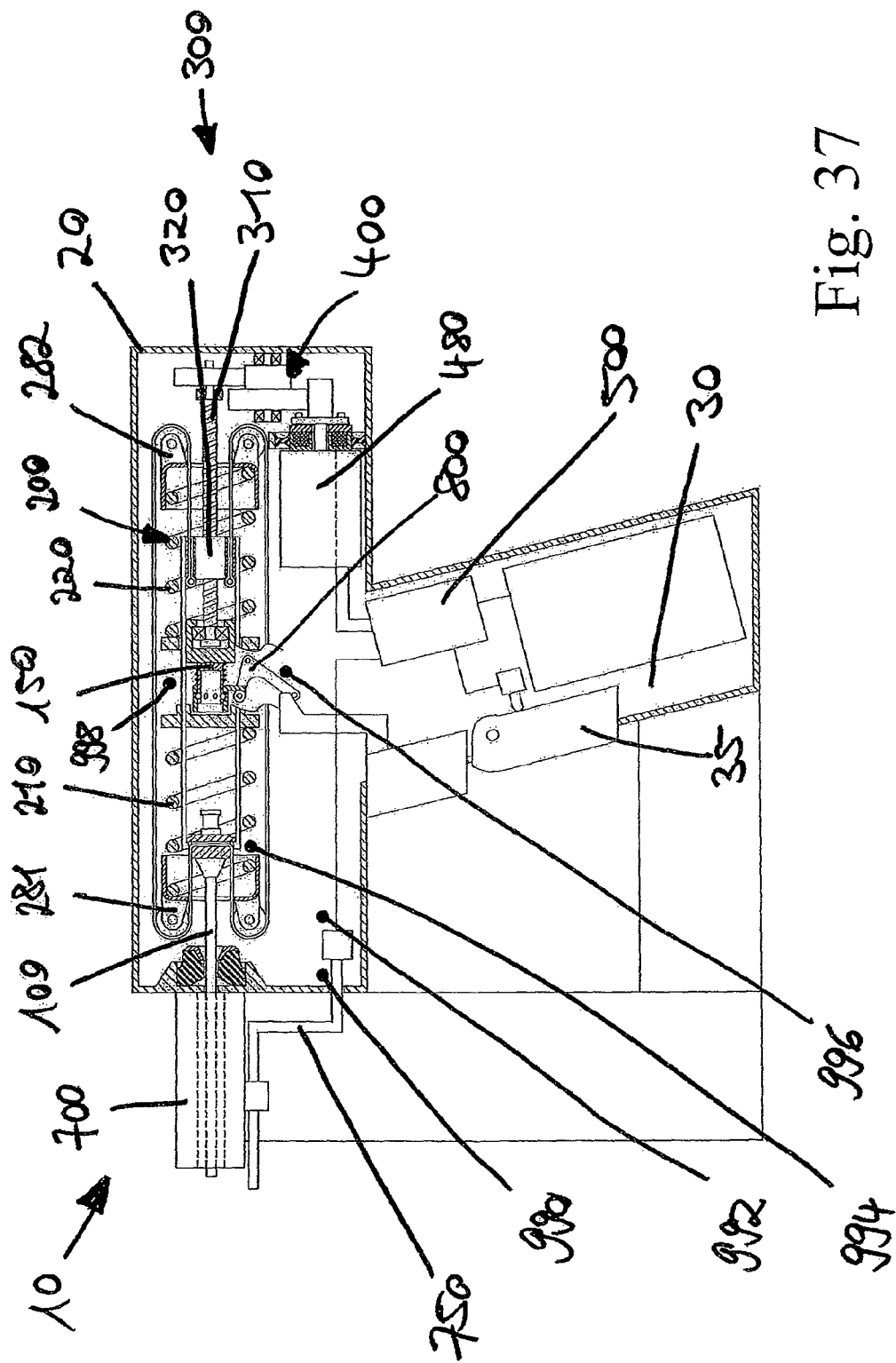
FIG. 37, a configuration schematic of a driving device.

FIG. 37 shows a schematic view of a driving device 10. The driving device 10 comprises a housing 20 which holds a piston 100, a coupling mechanism 150 held closed by a retaining element constructed as pawl 800, a spring 200 with a front spring element 210 and a rear spring element 220, a roll train 260 with a force diverter constructed as belt 270, a front roll holder 281 and a rear roll holder 282, a spindle drive 300 with a spindle 310 and a spindle nut 320, a transmission 400, a motor 480 and a control mechanism 500.

The driving device 10 further has a guide channel 700 for the fastening element and a contact-pressing mechanism 750. In addition, the housing 20 has a grip 30 on which a hand switch 35 is arranged.

The control mechanism 500 communicates with the hand switch 35 and also with several sensors 990, 992, 994, 996, 998, in order to detect the operating state of the driving device 10. 990, 992, 994, 996, 998 each have a Hall probe that detects the movement of a not-shown magnetic armature that is arranged, in particular, fastened, on each element to be detected.

With the guide channel sensor 990, a movement of the contact-pressing mechanism 750 toward the front is detected, wherein it is indicated that the guide channel 700 was removed from the driving device 10. With the contact-pressing sensor 992, a movement of the contact-pressing mechanism 750 toward the back is detected, wherein it is indicated that the driving device 10 is pressed onto a substrate. With the roll holder sensor, a movement of the front roll holder 281 is detected, wherein it is indicated whether the spring 200 is tensioned. With the pawl sensor 996, a movement of the pawl 800 is detected, wherein it is indicated whether a coupling mechanism 150 is held in its closed state. With the spindle sensor 998, it is finally detected whether the spindle nut 320 or a retracting rod mounted on the spindle nut 320 is in its rearmost position.

FIG. 38 shows a control configuration of the driving device in a simplified representation. The control mechanism 1024 is indicated by a central rectangle. The switch and/or sensor mechanisms 1031 to 1033 supply information or signals, as indicated by arrows, to the control mechanism 1024. A hand or main switch 1070 of the driving device connects to the control mechanism 1024. Through a double-headed arrow it is indicated that the control mechanism 1024 communicates with the accumulator 1025. Through additional arrows and a rectangle, a catch 1071 is indicated.

According to one embodiment, the hand switch detects holding by the user, and the control reacts to the switch being released by discharging the stored energy. In this way, safety is increased for the case of unexpected errors, such as dropping the bolt setting device.

Through additional arrows and rectangles 1072 and 1073, a voltage measurement and a current measurement are indicated. Through another rectangle 1074, a shutdown device is indicated. Through another rectangle, a B6 bridge 1075 is indicated. This involves a 6-pulse bridge circuit with semiconductor elements for controlling the electrical drive motor 1020. This is preferably controlled by driver components that are controlled in turn preferably by a controller. Such integrated driver components have, in addition to the suitable driving of the bridge, also the advantage that, if an undervoltage occurs, the switch elements of the B6 bridge are brought into a defined state.

Through an additional rectangle 1076, a temperature sensor is indicated that communicates with the shutdown device 1074 and the control mechanism 1024. Through another arrow it is indicated that the control mechanism 1024 outputs information to the display 1051. Through additional double-headed arrows it is indicated that the control mechanism 1024 communicates with the interface 1052 and with another service interface 1077.

Preferably, for the protection of the control device and/or the drive motor, in addition to the switches of the B6 bridge, another switch element is inserted in series that separates the power flow from the accumulator to the loads by means of the shutdown device 1074 through operating data, such as overcurrent and/or temperature rise.

For an improved and stable operation of the B6 bridge, the use of storage devices, such as capacitors, is useful. So that no current spikes are produced by the quick charging of such storage components, which would lead to increased wear of the electrical contacts, when the accumulator and control device are connected, these storage devices are preferably placed between the additional switch element and the B6 bridge and charged in a controlled manner according to the accumulator supply by means of suitable switching of the additional switch element.

Through additional rectangles 1078 and 1079, a fan and a locking brake are indicated that are controlled by the control mechanism 1024. The fan 1078 is used for circulating cooling air around components in the driving device for cooling. The locking brake 1079 is used for slowing down movements when the energy storage device 1010 is discharged and/or for holding the energy storage device in the tensioned or charged state. The locking brake 1079 can interact, for example, with the belt drive 1018 for this purpose.

Figure 39:
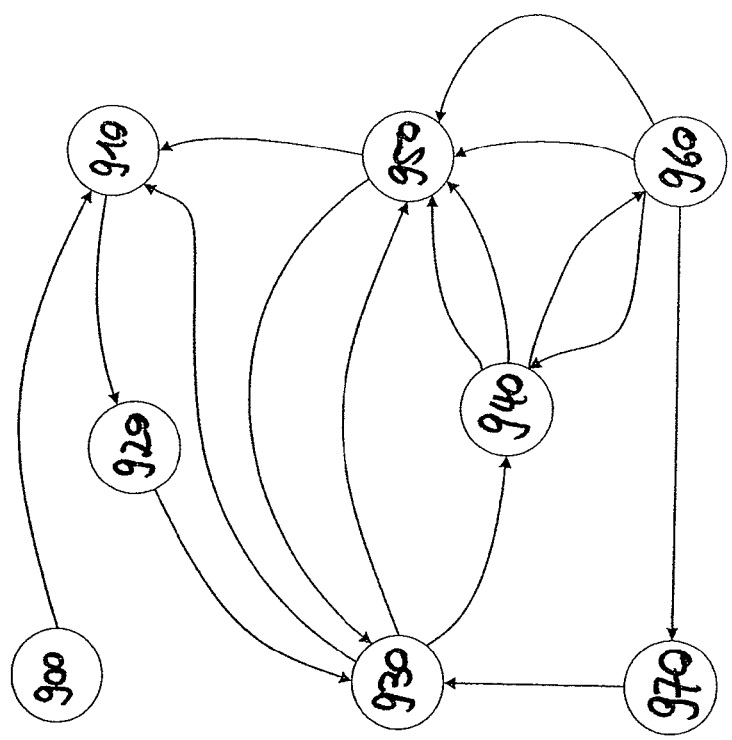
FIG. 39, a state diagram of a driving device.

FIG. 39 shows the control procedure of a driving device in the form of a state diagram in which each circle represents a device state or operating mode and each arrow represents a process through which the driving device is moved from a first device state or operating mode into a second.

In the "Accumulator removed" device state 900, an electrical-energy storage device, such as, for example, an accumulator, has been removed from the driving device. By inserting an electrical-energy storage device into the driving device, the driving device is set into the "Off" device state 910. In the "Off" device state 910, an electrical-energy storage device is inserted into the driving device, but the driving device is still turned off. By turning on with the hand switch 35 from FIG. 37, the "Reset" device mode 920 is reached in which the control electronics of the driving device are initialized. After a self-test, the driving device is finally moved into the "Tensioning" operating mode 930 in which a mechanical-energy storage device of the driving device is tensioned.

If the driving device is turned off with the hand switch 35 in the "Tensioning" operating mode 930, the driving device is moved directly back into the "Off" device state 910 when the driving device is still not tensioned. In contrast, for a partially tensioned driving device, the driving device is moved into the "Tension releasing" operating mode 950 in which tension is released from the mechanical-energy storage device of the driving device. On the other hand, if a tension path set in advance is reached in the "Tensioning" operating mode 930, then the driving device is moved into the "Ready-to-use" device state 940. Reaching the tension path is detected with the help of the roll holder sensor 994 in FIG. 37.

Starting from the "Ready-to-use" device state 940, the driving device is moved into the "Tension releasing" operating mode 950 if the hand switch 35 is turned off or by the determination that more time has elapsed than a predetermined time since reaching the "Ready-to-use" device state 940, for example, more than 60 seconds. In contrast, if the driving device has been pressed onto a substrate in due time, the driving device is moved to the "Ready-to-drive" device state 960 in which the driving device is ready for a driving procedure. Contact pressure is here detected with the help of the contact-pressing sensor 992 from FIG. 37.

Starting from the "Ready-to-drive" device state 960, the driving device is moved into the "Tension releasing" operating mode 950 and then into the "Off" device state 910 if the hand switch 35 is turned off or by the determination that more time has elapsed than a predetermined time since reaching the "Ready-to-drive" device state 960, for example, more than six seconds. In contrast, if the driving device is turned on again by actuation of the hand switch 35, while it is in the "Tension releasing" operating mode 950, it is moved from the "Tension releasing" operating mode 950 directly to the "Tensioning" operating mode 930. Starting from the "Ready to drive" operating mode 960, the driving device is moved back into the "Ready-to-use" device state 950 by lifting the driving device from the substrate. The lifting is here detected with the help of the contact-pressing sensor 992.

Starting from the "Ready-to-drive" operating mode 960, by pulling the trigger the driving device is moved into the "Driving" operating mode 970 in which a fastening element is driven into the substrate and the energy-transfer element moves into the starting position and is also coupled in the coupling mechanism. Pulling the trigger causes an opening of the coupling mechanism 150 in FIG. 37 by pivoting the associated pawl 800, which is detected with the help of the pawl sensor 996. From the "Driving" operating mode 970, the driving device is moved into the "Tensioning" operating mode 930 as soon as the driving device is lifted from the substrate. The lifting is detected here, in turn, with the contact-pressing sensor 992.

Figure 40:
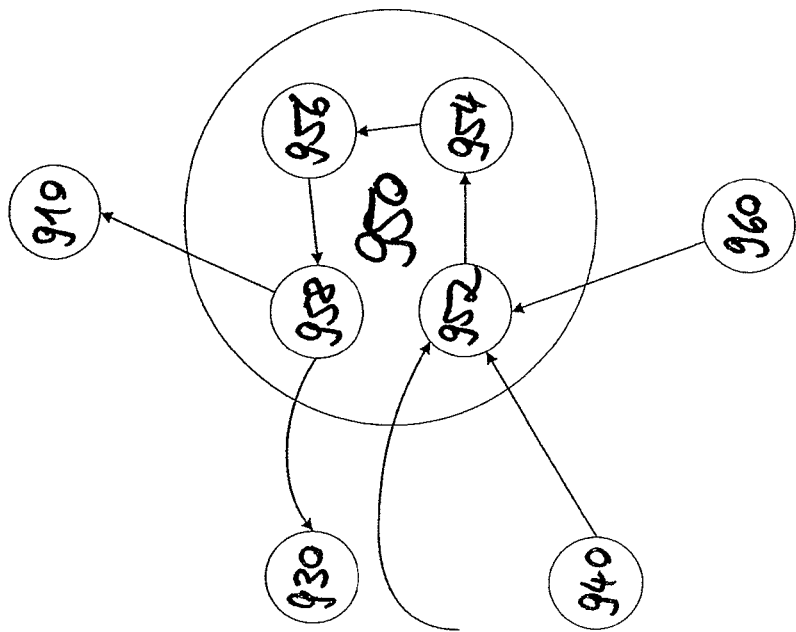
FIG. 40, a state diagram of a driving device.

FIG. 40 shows a more detailed state diagram of the "Tension releasing" operating mode 950. In the "Tension releasing" operating mode 950, initially the "Stopping motor" operating mode 952 is executed in which possibly existing rotation of the motor is stopped. The "Stopping motor" operating mode 952 is reached from any other operating mode or device state when the device is turned off with the hand switch 35. After a predetermined time span, the "Braking motor" operating mode 954 is then executed in which the motor is short-circuited and, operating as a generator, the tension-releasing procedure is braked. After another predetermined time span, the "Driving motor" operating mode 956 is executed in which the motor actively further brakes the tension-releasing process and/or brings the linear output into a predefined final position. Finally, the "Tension releasing complete" device state 958 is reached.

Figure 41:
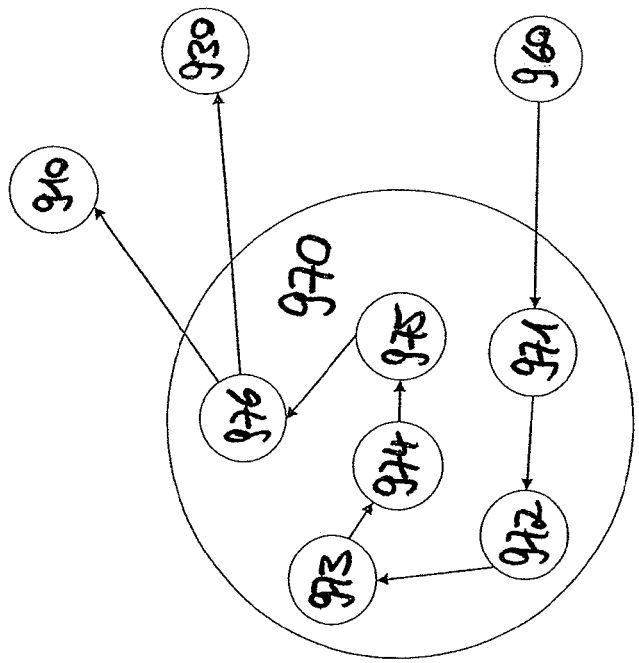
FIG. 41, a state diagram of a driving device.

FIG. 41 shows a more detailed state diagram of the "Driving" operating mode 970. In the "Driving" operating mode 970, initially the "Waiting for driving procedure" operating mode 971, then after the piston has reached its setting position, the "Fast motor running and open retaining mechanism" operating mode 972, then the "Slow motor running" operating mode 973, then the "Stopping motor" operating mode 974, then the "Coupling piston" operating mode 975, and finally the "Motor off and waiting for nail" operating mode 976 are executed. Reaching the coupling by the piston is here identified by a spindle sensor 998 from FIG. 37. Finally, the driving device is moved from there into the "Off" device state 910 by the determination that more time has elapsed than a predetermined time since reaching the "Motor off and waiting for nail" operating mode 976, for example, more time than 60 seconds.

Figure 42:
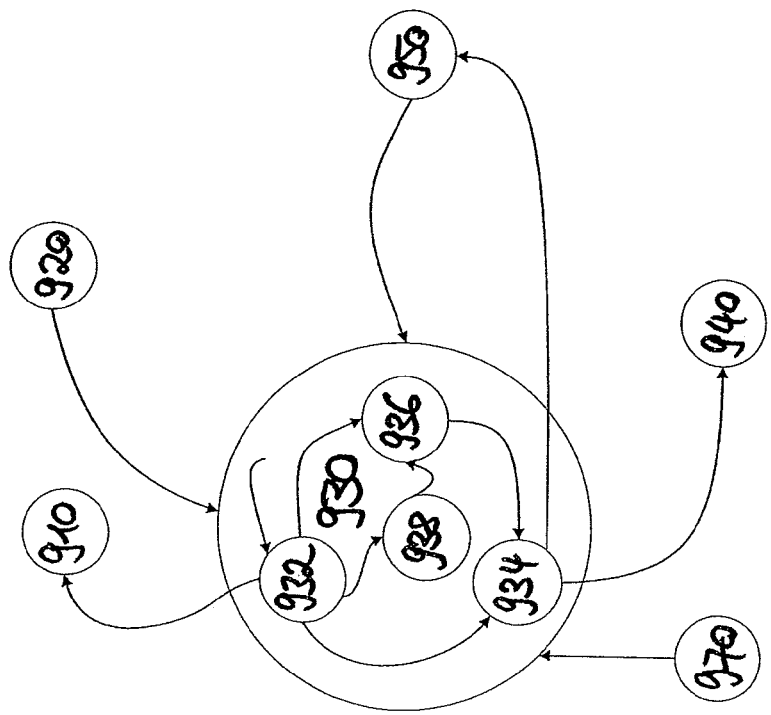
FIG. 42, a state diagram of a driving device.

FIG. 42 shows a more detailed state diagram of the "Tensioning" operating mode 930. In the "Tensioning" operating mode 930, initially the "Initializing" operating mode 932 is executed in which the control mechanism tests, with the help of the spindle sensor 998, whether the linear output is in its rearmost position or not and, with the help of the pawl sensor 996, whether the retaining element is holding the coupling mechanism closed or not. If the linear output is in its rearmost position and the retaining element holds the coupling mechanism closed, the device moves immediately into the "Tensioning mechanical-energy storage device" operating mode 934 in which the mechanical-energy storage device is tensioned because it is guaranteed that the energy-transfer element is coupled in the coupling mechanism.

If, in the "Initializing" operating mode 932, it is determined that the linear output is in its rearmost position, but the retaining element is not holding the coupling mechanism closed, initially the "Driving up linear output" operating mode 938 and after a predetermined time span the "Driving back linear output" operating mode 936 are executed, so that the linear output transports and couples the energy-transfer element backward for coupling. As soon as the control mechanism determines that the linear output is in its rearmost position and the retaining element is holding the coupling mechanism closed, the device is moved into the "Tensioning mechanical-energy storage device" operating mode 934.

If, in the "Initializing" operating mode 932, it is determined that the linear output is not in its rearmost position, then the "Driving back linear output" operating mode 936 is performed immediately. As soon as the control mechanism determines, with the help of the spindle sensor 998, that the linear output is in its rearmost position and the holding element is holding the coupling mechanism closed, the device moves, in turn, into the "Tensioning mechanical-energy storage device" 934.

Figure 43:
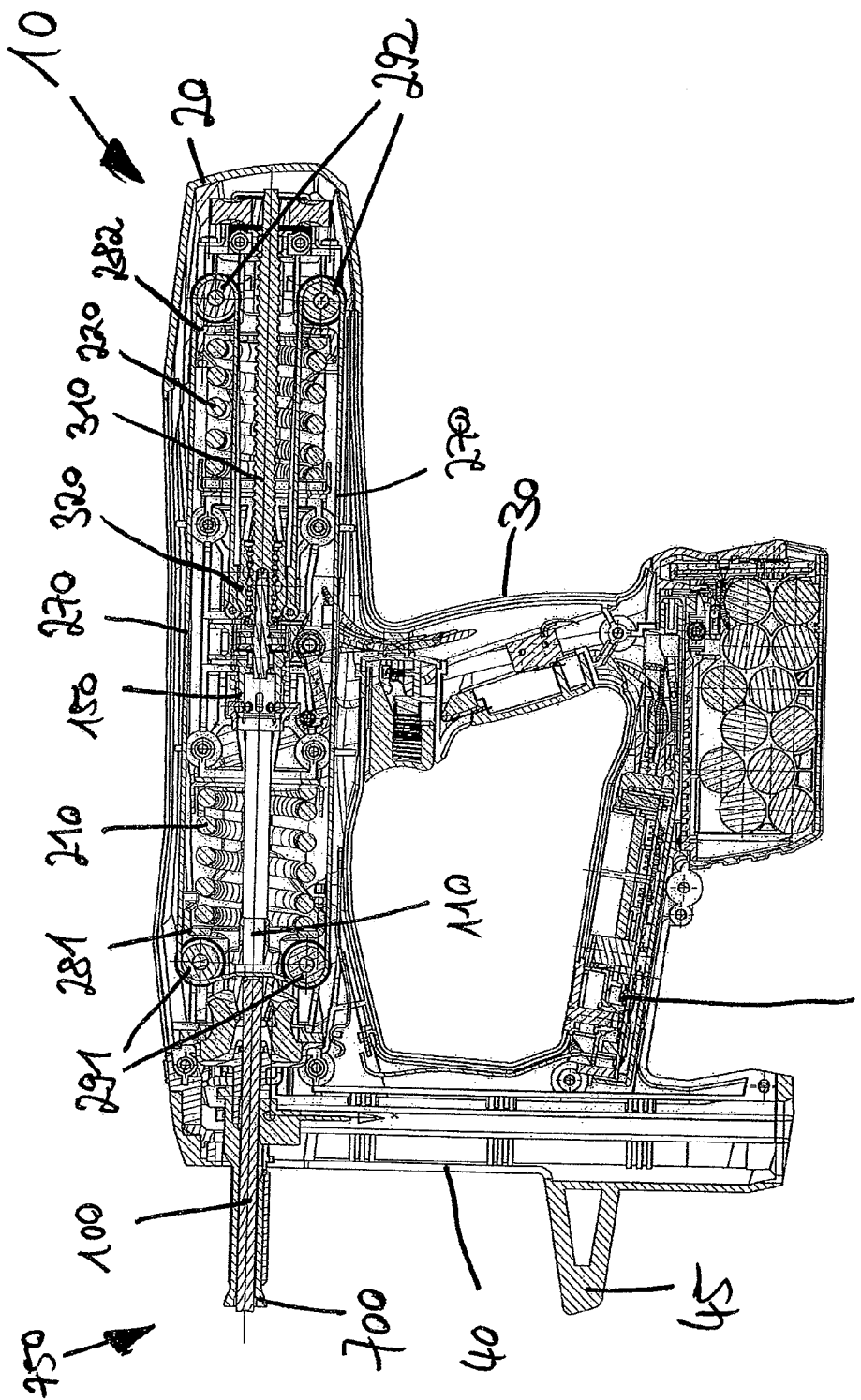
FIG. 43, a longitudinal section of a driving device.

FIG. 43 shows a longitudinal section of the driving device 10 after a fastening element has been driven, with the help of the piston 100, forward, that is, toward the left in the drawing, into a substrate. The piston is located in its setting position. The front spring element 210 and the back spring element 220 are located in the non-tensioned state in which they actually still have a certain residual tension. The front roll holder 281 is in its front-most position in the operating procedure, and the rear roll holder 282 is in its rearmost position in the operating procedure. The spindle nut 320 is located at the front end of the spindle 310. The belt 270 is essentially load-free due to the spring elements 210, 220 that are, under some circumstances, relaxed to a residual tension.

As soon as the control mechanism 500 has identified, by means of a sensor, that the piston 100 is in its setting position, the control mechanism 500 triggers a retracting procedure in which the piston 100 is transported into its starting position. For this purpose, by means of the transmission 400, the motor rotates the spindle 310 in a first rotational direction, so that the spindle nut 320 locked in rotation is moved backward.

The retracting rods here engage in the retracting pin of the piston 100 and thus likewise transport the piston 100 backward. The piston 100 here carries along the belt 270, wherein, however, the spring elements 210, 220 are not tensioned, because the spindle nut 320 likewise carries the belt 270 backward and here releases, by means of the rear rolls 292, just as much belt length as the piston pulls in between the front rolls 291. The belt 270 thus remains essentially load-free during the retracting procedure.

Figure 44:
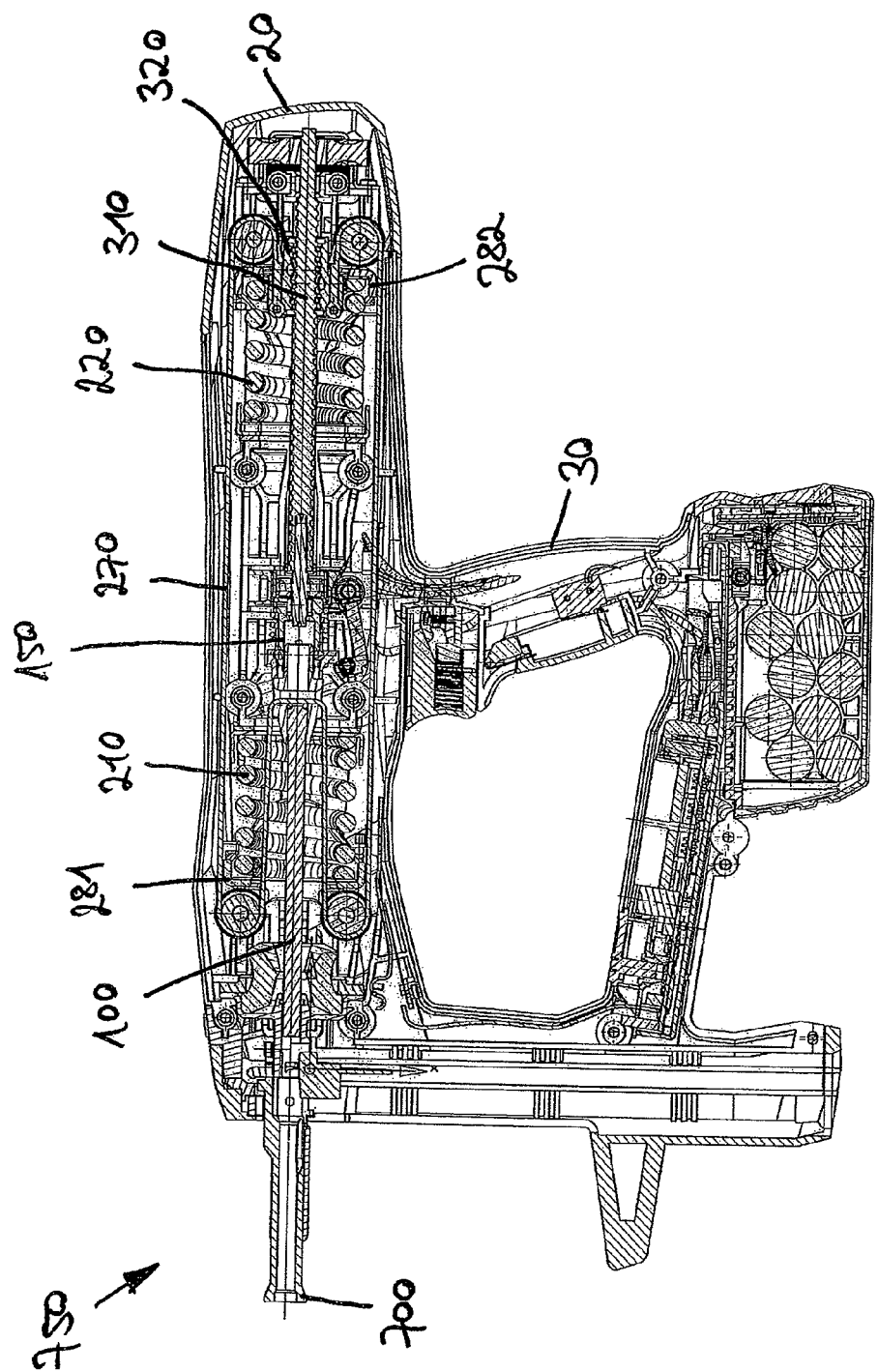
FIG. 44, a longitudinal section of a driving device and
FIG. 45, a longitudinal section of a driving device.

FIG. 44 shows a longitudinal section of the driving device 10 after the retracting procedure. The piston 100 is located in its starting position and is coupled with its coupling plug-in part 110 in the coupling mechanism 150. The front spring element 210 and the rear spring element 220 are further each located in their non-tensioned state; the front roll holder 281 is in its front-most position, and the rear roll holder 282 is in its rearmost position. The spindle nut 320 is located on the rear end of the spindle 310. Due to the relaxed spring elements 210, 220, the belt 270 is further essentially load-free.

If the driving device is now lifted from the substrate, so that the contact-pressing mechanism 750 is displaced forward relative to the guide channel 700, then the control mechanism 500 causes a tensioning procedure in which the spring elements 210, 220 are tensioned. For this purpose, by means of the transmission 400, the motor rotates the spindle 310 in a second rotational direction set opposite the first rotational direction, so that the spindle nut 320 that is locked in rotation is moved forward.

The coupling mechanism 150 here holds the coupling plug-in part 110 of the piston 100 fixed, so that the belt length that is pulled from the spindle nut 320 between the rear rolls 292 cannot be released by the piston. The roll holders 281, 282 are therefore moved toward each other and the spring elements 210, 220 are tensioned.

FIG. 45 shows a longitudinal section of the driving device 10 after the tensioning procedure. The piston 100 is further located in its starting position and is coupled with its coupling plug-in part 110 in the coupling mechanism 150. The front spring element 210 and the rear spring element 220 are tensioned; the front roll holder 281 is in its rearmost position and the rear roll holder 282 is in its front-most position. The spindle nut 320 is located at the front end of the spindle 310. The belt 270 diverts the tensioning force of the spring elements 210, 220 to the rolls 291, 292 and transfers the tensioning force to the piston 100 that is held against the tensioning force by the coupling mechanism 150.

The driving device is now ready for a driving procedure. As soon as a user pulls the trigger 34, the coupling mechanism 150 releases the piston 100 that then transfers the tensioning energy of the spring elements 210, 220 to a fastening element and drives the fastening element into the substrate.

The invention claimed is:

1. A device for driving a fastening element into a substrate, comprising a mechanical-energy storage device for storing mechanical energy, and an energy-transfer mechanism for transferring energy from an energy source to the mechanical-energy storage device, wherein the energy-transfer mechanism comprises a motor with a motor output that is connected in an uninterruptible and torque-coupled way to a rotational drive, a movement converter for converting a rotational movement into a linear movement with the rotational drive, and a linear output, a torque-transfer mechanism for transferring a torque from the motor output to the rotational drive and a force-transfer mechanism for transferring a force from the linear output to the energy storage device, and a rotating element that can rotate about a rotational axis and a retaining mechanism that faces the rotating element and exerts a holding force on the rotating element, in order to hold the rotating element against rotation.

2. The device according to claim 1, wherein the retaining mechanism is movable in the direction of the rotational axis, onto the rotating element, in order to hold the rotating element against rotation.

3. The device according to claim 2, wherein the retaining mechanism can be actuated electrically and comprises a magnetic coil.

4. The device according to claim 3, wherein the retaining mechanism exerts a holding force on the rotating element when an electrical voltage is applied and releases the rotating element when the electrical voltage stops being applied.

5. The device according to claim 1, wherein the motor with a motor output is connected to the mechanical-energy storage device.

6. The device according to claim 5, wherein the rotating element is arranged fixed in rotation relative to the motor output.

7. The device according to claim 1, wherein a torque can be transferred from the rotating element to the rotational drive and wherein the rotational axis of the rotating element is arranged offset relative to a rotational axis of the rotational drive.

8. The device according to claim 1, further comprising a motor-damping element that is suitable for absorbing movement energy of the motor and/or of the retaining mechanism with respect to the mechanical-energy storage device.

9. The device according to claim 8, wherein the motor-damping element comprises an elastomer.

10. The device according to claim 8, wherein the motor-damping element is arranged on the retaining mechanism.

11. The device according to claim 10, wherein the motor-damping element is fastened to the retaining mechanism.

12. The device according to claim 8, wherein the motor-damping element is suitable for absorbing vibration energy of the motor and/or of the retaining mechanism with respect to the mechanical-energy storage device.

13. The device according to claim 1, wherein the mechanical-energy storage device is suitable for storing potential energy.

14. A device for driving a fastening element into a substrate, comprising a mechanical-energy storage device for storing mechanical energy, and an energy-transfer mechanism for transferring energy from an energy source to the mechanical-energy storage device, wherein the energy-transfer mechanism comprises a motor with a motor output that is connected in an uninterruptible and torque-coupled way to a rotational drive, a movement converter for converting a rotational movement into a linear movement with the rotational drive, and a linear output, a torque-transfer mechanism for transferring a torque from the motor output to the rotational drive and a force-transfer mechanism for transferring a force from the linear output to the energy storage device, wherein the energy-transfer mechanism comprises a rotating element that can rotate about a rotational axis and a retaining mechanism that faces the rotating element and exerts a holding force on the rotating element, in order to hold the rotating element against rotation, wherein the retaining mechanism is movable in the direction of the rotational axis, onto the rotating element, in order to hold the rotating element against rotation.

15. A device for driving a fastening element into a substrate, comprising a mechanical-energy storage device for storing mechanical energy, and an energy-transfer mechanism for transferring energy from an energy source to the mechanical-energy storage device, wherein the energy-transfer mechanism comprises a rotating element that can rotate about a rotational axis and a retaining mechanism that faces the rotating element and exerts a holding force on the rotating element, in order to hold the rotating element against rotation, wherein the retaining mechanism is movable in the direction of the rotational axis, onto the rotating element, in order to hold the rotating element against rotation, and the retaining mechanism can be actuated electrically and comprises a magnetic coil, wherein the retaining mechanism exerts a retaining force on the rotating element when an electrical voltage is applied and releases the rotating element when the electrical voltage stops being applied.

16. The device according to claim 15, wherein the energy-transfer mechanism comprises a motor with a motor output that is connected in an uninterruptible and force-coupled way to the mechanical-energy storage device.

17. The device according to claim 15, further comprising a motor-damping element that is suitable for absorbing movement energy of the motor and/or of the retaining mechanism with respect to the mechanical-energy storage device.

18. The device according to claim 17, wherein the motor-damping element comprises an elastomer.

19. The device according to claim 17, wherein the motor-damping element is arranged on the retaining mechanism.

20. The device according to claim 19, wherein the motor-damping element is fastened to the retaining mechanism.

* * * * *